United States Patent
Perron et al.

(10) Patent No.: US 11,879,802 B2
(45) Date of Patent: Jan. 23, 2024

(54) TESTING OPTICAL FIBER LINK CONTINUITY USING OTDR BACKSCATTERING PATTERNS

(71) Applicant: EXFO Inc., Quebec (CA)

(72) Inventors: Stephane Perron, Quebec (CA); Michel Leclerc, Quebec (CA); Pascal Gosselin-Badaroudine, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 17/451,397

(22) Filed: Oct. 19, 2021

(65) Prior Publication Data

US 2022/0128434 A1 Apr. 28, 2022

Related U.S. Application Data

(60) Provisional application No. 63/104,159, filed on Oct. 22, 2020.

(51) Int. Cl.
*G01M 11/00* (2006.01)
*H04B 10/071* (2013.01)

(52) U.S. Cl.
CPC .... *G01M 11/3154* (2013.01); *G01M 11/3136* (2013.01); *H04B 10/071* (2013.01)

(58) Field of Classification Search
CPC ............ G01M 11/31; G01M 11/3109; G01M 11/3118; G01M 11/3127; G01M 11/3136; G01M 11/3145; G01M 11/3154; G01M 11/3163; G01M 11/3172; G01M 11/3181; G01M 11/319; H04B 10/071
See application file for complete search history.

(56) References Cited

U.S. PATENT DOCUMENTS

| | | | | |
|---|---|---|---|---|
| 4,236,904 A | * | 12/1980 | Lazay | G01B 11/04 356/73.1 |
| 4,968,112 A | * | 11/1990 | Lovely | G02B 6/24 385/11 |
| 5,069,544 A | * | 12/1991 | Buerli | G01M 11/3145 356/73.1 |
| 5,093,568 A | | 3/1992 | Maycock | |

(Continued)

FOREIGN PATENT DOCUMENTS

| CN | 201464156 U | 5/2010 |
|---|---|---|
| CN | 102761363 A | 10/2012 |

(Continued)

OTHER PUBLICATIONS

Koyamada, Yahei, Imahama, Mutsumi, Kubota, Kenya, Hogari, Kazuo, "Fiber-Optic Distributed Strain and Temperature Sensing With Very High Measurand Resolution Over Long Range Using Coherent OTDR," Journal of Lightwave Technology, vol. 27, No. 9, May 1, 2009.

(Continued)

*Primary Examiner* — Gordon J Stock, Jr.
(74) *Attorney, Agent, or Firm* — Helene Chotard

(57) ABSTRACT

There are provided methods and systems for testing the continuity of optical fiber links under test and/or a fiber arrangement, polarity or mapping of optical fiber connections within optical devices under test using the backscattering pattern as a signature. The device under test may comprises a single fiber, a duplex link, a multifiber cable or another multi-port device such as a backplane device.

18 Claims, 18 Drawing Sheets

(56) References Cited

U.S. PATENT DOCUMENTS

| | | | |
|---|---|---|---|
| 5,130,535 A * | 7/1992 | Kummer | G01M 11/39 356/73.1 |
| 5,285,305 A | 2/1994 | Cohen et al. | |
| 5,365,328 A | 11/1994 | Anderson | |
| 5,373,356 A | 12/1994 | Anderson | |
| 5,432,637 A * | 7/1995 | Hakimi | G01M 11/3109 385/11 |
| 5,442,434 A | 8/1995 | Liao | |
| 5,708,500 A | 1/1998 | Anderson | |
| 5,966,207 A | 10/1999 | Haskins | |
| 6,046,797 A | 4/2000 | Spencer et al. | |
| 6,067,150 A | 5/2000 | Beller et al. | |
| 6,381,011 B1 * | 4/2002 | Nickelsberg | G01M 11/3109 356/73.1 |
| 6,674,518 B1 | 1/2004 | Asher | |
| 6,710,862 B1 | 3/2004 | Wilson | |
| 6,839,130 B2 | 1/2005 | Araki et al. | |
| 7,440,087 B2 | 10/2008 | Froggatt et al. | |
| 7,772,541 B2 | 8/2010 | Froggatt et al. | |
| 7,808,621 B2 | 10/2010 | Russell | |
| 7,859,654 B2 | 12/2010 | Hartog | |
| 8,482,725 B2 | 7/2013 | Perron et al. | |
| 8,570,501 B2 | 10/2013 | Nagel et al. | |
| 8,576,387 B2 | 11/2013 | Woodward et al. | |
| 8,670,110 B2 | 3/2014 | Schillab | |
| 8,711,341 B2 * | 4/2014 | Blair | G01M 11/3136 356/73.1 |
| 8,964,172 B1 | 2/2015 | Breiholz et al. | |
| 9,097,615 B2 | 8/2015 | Xia et al. | |
| 9,103,746 B2 | 8/2015 | Kaufhold | |
| 9,184,833 B2 * | 11/2015 | Kassler | G01M 11/3154 |
| 9,310,274 B2 | 4/2016 | Nagel et al. | |
| 9,329,098 B2 | 5/2016 | Sanchez | |
| 9,423,316 B2 | 8/2016 | Perron | |
| 9,435,713 B2 | 9/2016 | Collier | |
| 9,709,460 B2 * | 7/2017 | Leblanc | G01M 11/31 |
| 9,774,390 B2 | 9/2017 | Zhou | |
| 10,014,935 B2 | 7/2018 | Perron | |
| 10,135,531 B1 | 11/2018 | Joffe | |
| 10,371,596 B2 | 8/2019 | L'Heureux et al. | |
| 10,784,969 B2 | 9/2020 | Weiner | |
| 10,862,582 B1 * | 12/2020 | L'Heureux | H04B 10/035 |
| 11,035,753 B2 | 6/2021 | Gagnon et al. | |
| 11,125,648 B2 | 9/2021 | Perron | |
| 11,228,365 B1 | 1/2022 | Desplat et al. | |
| 11,271,641 B1 * | 3/2022 | Perron | G01M 11/3136 |
| 11,368,214 B2 | 6/2022 | Ahadian et al. | |
| 11,606,139 B2 * | 3/2023 | Perry | H04B 10/272 |
| 11,650,128 B2 * | 5/2023 | Leclerc | G01M 11/3145 356/73.1 |
| 2008/0231842 A1 * | 9/2008 | Brendel | G01M 11/3145 356/73.1 |
| 2011/0149271 A1 * | 6/2011 | Woodward | G01M 11/3109 356/73.1 |
| 2011/0153544 A1 * | 6/2011 | Nagel | H04B 10/071 706/54 |
| 2014/0362367 A1 * | 12/2014 | Chen | G01M 11/3145 356/73.1 |
| 2015/0062562 A1 | 3/2015 | Kassler | |
| 2015/0124246 A1 | 5/2015 | Collier et al. | |
| 2015/0198503 A1 * | 7/2015 | Leblanc | G01M 11/3172 356/73.1 |
| 2017/0085317 A1 | 3/2017 | Ruchet | |
| 2020/0386653 A1 | 12/2020 | Perron | |
| 2021/0123817 A1 | 4/2021 | Champavere | |
| 2021/0199536 A1 | 4/2021 | Perron et al. | |
| 2021/0242943 A1 * | 8/2021 | Cao | H04B 10/2537 |
| 2021/0404909 A1 | 12/2021 | Leclerc et al. | |
| 2022/0128434 A1 | 4/2022 | Perron et al. | |

FOREIGN PATENT DOCUMENTS

| | | |
|---|---|---|
| CN | 104422582 A | 3/2015 |
| CN | 106197946 A | 12/2016 |
| CN | 107664571 A | 2/2018 |
| DE | 102016124654 A1 | 6/2018 |
| EP | 2755008 A2 | 7/2014 |
| EP | 2356760 B1 | 6/2018 |
| EP | 3758256 | 12/2020 |
| EP | 3758256 B1 | 12/2021 |
| EP | 3933371 A1 | 1/2022 |
| GB | 2499386 A | 8/2013 |
| KR | 20140051495 A | 5/2014 |
| WO | 9705713 A1 | 2/1997 |
| WO | 2008115375 A1 | 9/2008 |
| WO | 2009006837 A1 | 1/2009 |
| WO | 2011153126 A2 | 12/2011 |
| WO | 2012087205 | 6/2012 |
| WO | 2013002692 | 1/2013 |
| WO | 2021158492 A1 | 8/2021 |

OTHER PUBLICATIONS

Hartog, Arthur H., "An Introduction to Distributed Optical Fibre Sensors", 1st edition Paperback—Jun. 28, 2018, pp. 267-273, CRC Press Taylor & Francis Group, Boca Raton, FL.

Luna, Luna Researchers Harness the Power of Fiber Fingerprints, 2019 [online]. Retrieved from the Internet on Apr. 2, 2019: <URL: https://lunainc.com/fiber-optic-solutions/luna-researchers-harness-the-power-of-fiber-fingerprints/>.

Gysel et al., Statistical Properties of Rayleigh Backscattering in Single-Mode Fibers, IEEE, Journal of Lightwave Technology, Apr. 1990, vol. 8. No. 4.

Mermelstein et al., Rayleigh scattering optical frequency correlation in a single-mode optical fiber, Optics Letters, Jan. 15, 2001, vol. 26, No. 2, Washington, D.C., United States.

K De Souza, Significance of coherent Rayleigh noise in fibre-optic distributed temperature sensing based on spontaneous Brillouin scattering, DOI: 10.1088/0957-0233/17/5/S21, Institute of Physics Publishing, Measurement Science and Technology, vol. 17, 2006, pp. 1065-1069.

Brodsky et al., Rayleigh backscattering from optical fibers—could it be used to identify individual fibers?, Optical Society of America, 2010.

Naseem et al., Composite Coding Scheme for OTDR SNR Enhancement, 11th International Conference on Telecommunications—ConTEL 2011, Special Session on Optical Access, ISBN: 978-3-85125-161-6, Jun. 15-17, 2011, Graz, Austria.

Palmieri et al., Distributed Optical Fiber Sensing Based on Rayleigh Scattering, The Open Optics Journal, 2013, vol. 7, (Suppl-1, M7) 104-127.

Villafani Caballero et al., Tuneable OTDR Measurements for WDM-PON Monitoring, Conference paper, DOI: 10.1109/IMOC.2013. 6646511, Aug. 2013.

Du et al., Unclonable Optical Fiber Identification Based on Rayleigh Backscattering Signatures, IEEE, Journal of Lightwave Technology, DOI 10.1109/JLT.2017.2754285, 2017.

Guemes et al., Fiber Optic Distributed Sensing, STO-EN-AVT-220, retrieved Nov. 5, 2019.

Park et al., Coded optical time domain reflectometry: principle and applications, Proc. of SPIE vol. 6781, 678129, DOI: 10.1117/12. 746977, 2007.

Koyamada et al., "Novel Fiber-Optic Distributed Strain and Temperature Sensor with Very High Resolution", IEICE Transactions on Communications, vol. E89-B, No. 5, May 2016, pp. 1722-1725.

Shuangqi Guo, Chaotic-pulse hybrid signal optical time-domain reflectometer, Applied Optics, Jul. 2017, vol. 38, No. 4, pp. 569-574.

* cited by examiner

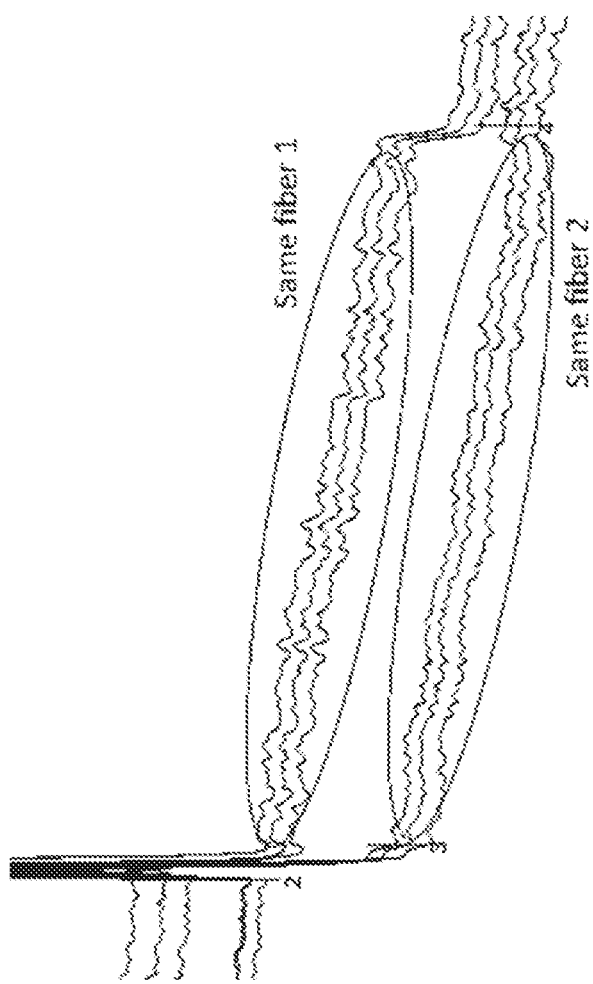

TESTING OPTICAL FIBER LINK CONTINUITY USING OTDR BACKSCATTERING PATTERNS

TECHNICAL FIELD

The present description generally relates to Optical Time-Domain Reflectometry (OTDR), and more particularly to identifying optical fibers using as a signature, the backscattering pattern produced by an optical fiber in OTDR traces.

BACKGROUND

The position of receiving and transmitting optical fibers at a multi-fiber array cable connector defines what is referred to in the industry as the polarity. Various multi-fiber array cable types are defined by the TIA/EIA-568-C.3 Standard, each having a specific 1×12 or 2×12 fiber arrangement (i.e., Type A, Type B and Type C (1×12)). Other proprietary or custom multi-fiber array cabling systems also exist. The multi-fiber array cable type or fiber arrangement is referred to herein as the "polarity" of a multi-fiber array cable or link.

Tier-1 (or "basic") fiber optic testing is a measurement of end-to-end characteristics of a fiber optic link, i.e., from one end to the other. These characteristics include the total link insertion loss and the continuity, and may also include the total link length and/or optical fiber link polarity. Standard organizations recommend the use of a Light Source-Power Meter (LS/PM) solution to perform Tier-1 testing.

Optical Loss Test Sets (OLTS) are advanced implementations of the LS/PM solution. OLTSs allow to perform what is called "real-time continuity". OLTS units are working in pair wherein each unit is constantly monitoring communications received from the other one. Two costly test instruments are therefore required (one at each end of the optical fiber link under test).

LS/PM solutions, including OLTSs, rely on a power reference procedure to take care of source/optics stability issues. The reference procedure increases the overall measurement process time and is subject to manipulation errors likely to cause unreliable measurements.

Tier-2 (or "extended") fiber optic testing is used to characterize each loss contributor and potential issue along the link. Tier-2 testing is performed by Optical Time-Domain Reflectometry (OTDR—also used to refer to the corresponding device). OTDR is a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain and insertion loss of the fiber link under test, as well as each component along the link, can be characterized. In OTDR measurements, there is no need for a power reference step as described above.

Prior art OTDR methods can perform end-to-end measurements on optical fiber links using a single OTDR instrument connected at the near end of the optical fiber link under test. However, when there is no test instrument at the remote end, link continuity verification is based on an analysis of the fiber Rayleigh Backscattering (RBS) level, which does not provide a robust link continuity verification. Link continuity cannot be confirmed because there is no unambiguous detection of the end of fiber. Adding a receive fiber at the far end of the link under test does not solve the ambiguity issue.

The reliability of the link continuity verification can be significantly improved by connecting an encoded receive device at the remote end of the optical fiber link under test. Receive devices may be encoded by inserting a reflective optical signature along each individual receive fiber, which is created by a combination of discrete event features, such as connectors, splices, an end of fiber or any other element along the optical path, in order to generate a unique signature pattern that is detectable and recognizable on an OTDR trace based, e.g., on a distance between discrete event features (see, e.g., U.S. Pat. No. 8,482,725 to Perron).

In a data center context, it is often mandatory to certify each newly installed fiber. For example, in web-scale data centers, the number of required encoded receive fibers can become enormous and very expensive.

There is therefore a need for an improved OTDR measurement method that can provide link continuity and/or polarity testing.

SUMMARY

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace. Because the structural fluctuations along optical fibers are random, any measured backscattering pattern is unique to a given optical fiber segment and OTDR laser source combination.

For a given optical fiber segment and OTDR laser source combination, the measured backscattering pattern is not random. It is determined the small fluctuations in the fiber structure, combined with the characteristics of the OTDR laser source and is hence completely deterministic.

However, characteristics of the OTDR test pulses may fluctuate in time, including polarization state, wavelength and spectral shape, due, e.g., to temperature variations in the laser source. The ambient temperature of the optical fiber segment also changes the fiber structure and therefore the backscattering pattern. These characteristics of the OTDR test pulses and optical fiber structure can induce variations in the backscattering pattern associated with a given optical fiber segment.

The presence of such backscattering pattern phenomenon is known in the art of OTDR but is typically regarded as noise that should be eliminated. Conventional OTDRs are thus designed to try to minimize the amplitude of this backscattering pattern, e.g., by using broader light sources, and any remaining backscattering pattern is deemed noise.

There is herein provided OTDR methods and systems that profit from the backscattering pattern produced by an optical fiber in an OTDR trace by using it as a signature (also referred to herein as the "RBS fingerprint") to recognize receive fibers connected to a single-fiber or multi-fiber link under test in order to test a continuity and/or a polarity thereof. The backscattering pattern can be used as a signature to recognize a pre-characterized receive fiber or specific optical fibers of a multifiber receive cable and distinguish each fiber of the receive cable from one another, thereby replacing complex and costly discrete reflective signatures by a simple segment of optical fiber such as, e.g., SMF-28 fiber.

There are therefore provided herein methods and systems for testing the continuity of optical fiber links under test and/or a fiber arrangement, polarity or mapping of optical fiber connections within optical devices under test using the backscattering pattern as a signature. The device under test may comprises a single fiber, a duplex link, a multifiber cable or another multi-port device such as a backplane device.

It was found that it is difficult to obtain repeatable signatures as those are sensitive to the wavelength of the OTDR laser source, the polarization state of light propagating in the optical fiber and the fiber temperature. However, in some controlled environments, such as manufacturing facilities or labs, no special care may be needed to obtain repeatable signature patterns, except maybe for a thermal stabilization of the OTDR light source (so as to minimize the wavelength drift of the OTDR laser source over the complete OTDR test procedure), unless the internal temperature of the OTDR laser source is found to remain sufficiently stable in time. Stability may also be obtained by employing adequate OTDR laser linewidth to reduce the signature variability that is due to wavelength drift of the OTDR laser source. Optionally, a polarization-scrambled OTDR laser source may also reduce the signature variability that is due to varying polarization states of light propagating in the optical fiber. In controlled environments, minimal OTDR design precautions have shown to produce signature patterns that are repeatable enough for at least some applications.

As explained hereinbelow, minimal OTDR design precautions, including adequate OTDR linewidth, have also shown to produce signature patterns that are repeatable enough for detection in case of bidirectional OTDR measurements on the links under test, in which the near-end portion of the OTDR trace acquired in the backward direction is used to characterize a signature that is to be identified in the far-end portion of the OTDR acquired in the forward direction (loopback devices under test). In such OTDR measurement process, the backward OTDR trace is used as a reference measurement to characterize the signature to be identified in the forward OTDR trace. There is therefore no need for a prior reference measurement characterizing all signatures. If the whole OTDR measurement process that acquires forward and backward traces can be completed in a short enough time, the backscattering patterns may remain sufficiently stable for detection.

However, in some applications, including outdoor testing and some indoor applications, temperature fluctuations and/or wavelength drifts make the signature not repeatable enough for detection. In these cases, the OTDR methods and systems may be adapted to compare the backscattering pattern in a more repeatable manner.

Co-owned U.S. patent application Ser. No. 17/360,357 (not yet published), which is hereby incorporated by reference, describes such adapted OTDR methods and systems which employ a temperature correction technique wherein a) each signature is pre-characterized over a range of temperatures or center wavelengths and matches are found by comparing a measured backscattering pattern to the set of patterns obtained for each pre-characterized signature, in order to find a match; or b) each signature is pre-characterized at a single temperature and, during measurement, the OTDR laser is tuned until a match is found between the measured backscattering pattern and a pre-characterized signature.

Therefore, in accordance with another aspect, there is provided an OTDR method for testing a fiber link continuity of an optical fiber link connected at its remote end to a receive fiber, the method comprising:

receiving a backscattering pattern characterizing the receive fiber;

performing an OTDR acquisition toward the optical fiber link, wherein said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test; and searching in said OTDR trace for said backscattering pattern to determine if said OTDR trace comprises said backscattering pattern;

wherein a link continuity is determined when said backscattering pattern is found in said OTDR trace.

In accordance with one aspect, there is provided an OTDR method for testing a fiber link continuity in a multi-fiber device comprising a plurality of optical fiber links, according to a fiber arrangement, the method comprising:

receiving a set of backscattering patterns acquired over a corresponding set of receive fibers;

performing an OTDR acquisition toward at least one of said optical fiber links, said one of said optical fiber links being connected at its remote end to a first receive fiber and wherein said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test; and in said OTDR trace, searching for one backscattering pattern among said set of backscattering patterns, corresponding to one receive fiber, to determine if said first receive fiber matches said one receive fiber;

wherein a link continuity of said one of said optical fiber links is determined when a match is found.

The proposed solution also applies to single optical fiber links, to assert a continuity thereof.

In yet other applications, a multi-port device may comprise at least one optical fiber link connected in loop between two ports of the multi-port device and OTDR traces are acquired from each port. Comparing backscattering patterns in OTDR traces may allow to confirm an optical fiber link continuity and/or a fiber arrangement of the optical fiber link.

Therefore, in accordance with another aspect, there is provided an OTDR method for testing fiber link continuity in a multi-port device comprising at least one optical fiber link connected in loop between two ports of said multi-port device, according to a fiber arrangement, the method comprising:

receiving a set of OTDR traces acquired toward corresponding ports of said multi-port device, wherein each said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test and wherein said corresponding ports comprise said two ports connected to said at least one optical fiber link;

extracting from at least one OTDR trace among said set, a first backscattering pattern corresponding to at least a portion of said one OTDR trace acquired over a first fiber span, wherein said one OTDR trace is acquired toward one port of a first optical fiber link;

searching for said first backscattering pattern in at least another OTDR trace of said set, wherein said another OTDR trace is found to match said one OTDR trace when the first backscattering pattern is found, the matching OTDR traces then being determined to be acquired toward opposite ports of said first optical fiber link;

wherein a link continuity of said first optical fiber link is determined when a match is found.

In this latest case, the backscattering patterns can be extracted from any part of the OTDR trace, including fiber spans along the optical fiber links of the multi-port device under test if the link is sufficiently long to produce a recognizable signature, or fiber spans corresponding to launch/receive fibers connected to individual ports of the multi-port device.

An OTDR system for testing fiber link continuity in a multi-fiber device comprising a plurality of optical fiber links, according to a fiber arrangement, the OTDR system comprising:

a data store storing a set of backscattering patterns acquired over a corresponding set of receive fibers;

an OTDR acquisition device connectable toward an end of an optical fiber link under test for performing one or more OTDR acquisitions toward the optical fiber link under test, wherein each OTDR acquisition is performed by propagating a test signal in the optical fiber link under test and detecting corresponding return light from the optical fiber link under test so as to obtain an OTDR trace representing backscattered and reflected light as a function of distance in the optical fiber link under test;

a processing unit configured for receiving an OTDR trace acquired toward at least one of said optical fiber links of said multi-fiber device, said one of said optical fiber links being connected at its remote end to a first receive fiber; and searching in said OTDR trace for one backscattering pattern among said set, corresponding to one receive fiber, to determine if said first receive fiber matches said one receive fiber;

wherein a link continuity of said one of said optical fiber links is determined when a match is found.

A non-transitory computer-readable storage medium comprising instructions that, when executed, cause a processor to perform the steps of:

receiving a set of backscattering patterns acquired over a corresponding set of receive fibers; and receiving an OTDR trace acquired over at least one of optical fiber links of a multi-fiber device comprising a plurality of optical fiber links, said one of said optical fiber links being connected at its remote end to a first receive fiber;

searching in said OTDR trace for one backscattering pattern among said set, corresponding to one receive fiber, to determine if said first receive fiber matches said one receive fiber;

wherein a link continuity of said one of said optical fiber links is determined when a match is found.

A non-transitory computer-readable storage medium comprising instructions that, when executed, cause a processor to perform the steps of:

receiving a set of OTDR traces acquired toward corresponding ports of a multi-port device comprising at least one optical fiber link connected in loop between two ports of said multi-port device, according to a fiber arrangement, wherein each said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test;

extracting from at least one OTDR trace among said set, a first backscattering pattern corresponding to at least a portion of said one OTDR trace acquired over a first fiber span, wherein said one OTDR trace is acquired toward one port of a first optical fiber link;

searching for said first backscattering pattern in at least another OTDR trace of said set, wherein said another OTDR trace is found to match said one OTDR trace when the first backscattering pattern is found, the matching OTDR traces the being determined to be acquired toward opposite ports of said first optical fiber link;

wherein a link continuity of said first optical fiber link is determined when a match is found.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

Further features and advantages of the present invention will become apparent to those of ordinary skill in the art upon reading of the following description, taken in conjunction with the appended drawings.

BRIEF DESCRIPTION OF THE DRAWINGS

FIG. 1 is a graph illustrating OTDR traces as obtained with OTDR acquisitions repeated over the same fiber 1, compared with those repeated over another same fiber 2.

FIG. 13 comprises FIG. 13A, FIG. 13B and FIG. 13C which are schematics showing a system for testing a duplex link under test, in accordance with one embodiment, in which

Figure 3:
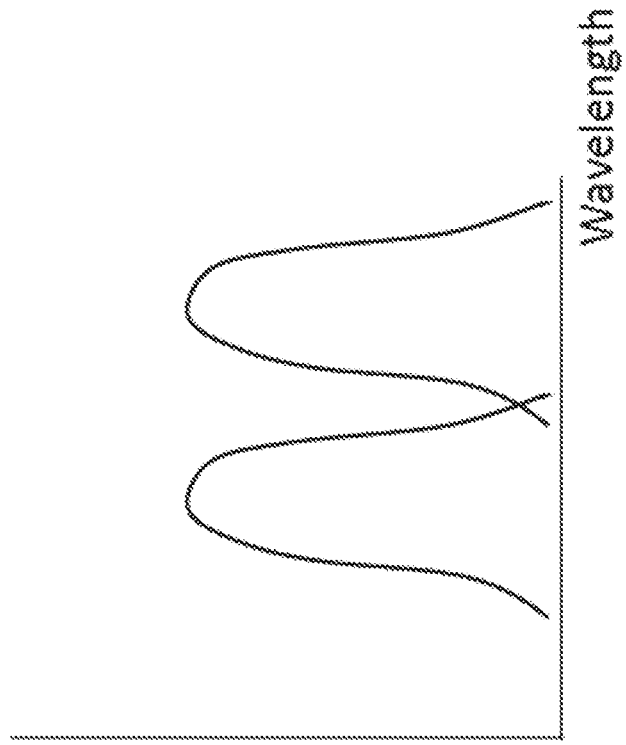
FIG. 3 is a graph illustrating a very weak spectral overlap between the OTDR laser sources used in two OTDR acquisitions, which will produce different signatures and a low signature correlation.

It will be noted that throughout the drawings, like features are identified by like reference numerals. To not unduly encumber the figures, some elements may not be indicated in some figures if they were already identified in a preceding figure. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments

DETAILED DESCRIPTION

FIG. 1 shows a graph illustrating OTDR traces as obtained with OTDR acquisitions repeated over the same fiber 1, compared with those obtained with OTDR acquisitions repeated over another same fiber 2.

The manufacturing process of optical fibers produces small fluctuations in the optical fiber structure along any segment of optical fiber. When such fluctuations interact with the OTDR test pulses, it creates interferences and modulations that produce a backscattering pattern in the acquired OTDR trace.

As can be seen in FIG. 1, when OTDR measurements are repeated over the same optical fiber 1, a similar backscattering pattern is found. However, because the structural fluctuations along optical fibers are random, OTDR measurements performed on a different optical fiber 2 show a different backscattering pattern. The backscattering pattern can therefore be used as a signature to recognize optical fibers which signatures were pre-characterized.

As such, optical fibers can be recognized by comparing the acquired OTDR traces, and more specifically, the backscattering pattern associated with a given fiber span along the OTDR trace, which correspond to a continuous optical fiber section where backscattering is typically dominant over reflections and electronic noise.

The backscattered light may be described as the coherent superposition of the light generated by many weak reflectors, randomly spread in the fiber. Each of these reflectors can be described by means of Rayleigh's theory, according to which the backscattered light is in phase with the incident one and has the same polarization. However, the intensity of the light reflected by the single scattering center is a random quantity, because so are density fluctuations.

The complex envelope, b(t), of the backscattered light in a single mode fiber can be described by the following expression:

$$b(t) = \sum_n c_n e^{-2[\alpha(z_n)+j\beta z_n]} a(t - 2\tau_n), \quad (1)$$

where $\beta$ is the propagation constant of the fiber, $\alpha(z)$ describes the attenuation accumulated up to z, $c_n$ and $z_n$ are the random amplitude and position of the nth scattering center, $T_n$ is the group delay introduced by the propagation up to $z_n$, the factor 2 takes in to account roundtrip propagation, and a(t) is the complex envelope of the test signal used to probe the fiber (see P. Gysel and R. K. Staubli, "Statistical properties of Rayleigh backscattering in single-mode fibers," in *Journal of Lightwave Technology*, vol. 8, no. 4, pp. 561-567, April 1990).

Note that these values representing the scattering elements of the fiber can be considered constant as long as the fiber is not perturbed.

We herein define the "Coherent Rayleigh Noise" (CNR) in the backscattered light b(t) as the noise that is inherent to Rayleigh backscattered radiation and is due to the interference among the large number of lightwaves backscattered at different positions in the fiber and thereby causing phase-intensity noise conversion.

The Coherent Rayleigh Noise manifests itself during OTDR measurement, as a "backscattering pattern" in the measured OTDR trace.

A coherent OTDR can be used to measure the backscattering light b(t). The acquired OTDR signal is then equivalent to the convolution of the backscattering light b(t) with the OTDR signal pulse function:

$$S(t)=b(t)*\text{pulse}_T(t) \quad (2)$$

wherein S(t) is the measured signal, which is a complex signal; and pulser(t) represents the OTDR signal pulse function for a pulse length T.

The same applies to conventional (i.e., non coherent) OTDR except that in the case of a non-coherent receiver, what is measured is the intensity of the backscattered light:

$$|S(t)|^2 = |b(t)*\text{pulse}_T(t)|^2 \quad (3)$$

From these equations, we find that:
 - The model of the fiber is a linear superposition of distributed random stable scatters along the fiber
 - The signal received by an OTDR is the intensity of the convolution of the OTDR signal pulse function with the interferences of the pulse light wavelength with backscatter sections of the fiber
 - A conventional OTDR measures the intensity of the interference pattern from the backscattered light The backscattering pattern as measured with a conventional (i.e., non-coherent) OTDR represents an interference pattern resulting from the combination of the fiber structure and the OTDR signal pulse function and spectrum. The backscattering pattern is subject to change with the following factors:
 - The temperature of the optical fiber
 - A mechanical stress in the optical fiber or a vibration
 - The central wavelength of the OTDR pulsed light source
 - The spectral width and spectral function of the OTDR pulsed light source
 - The OTDR signal pulse function (the pulse width acting as a filter)
 - The direction of light propagation in the optical fiber
 - The polarization state of the OTDR light source (a change in polarization may add a noise floor to the backscattering pattern in case of rotation anywhere before the analyzed RBS section).

A given backscattering pattern measured by a conventional OTDR is therefore repeatable under the following conditions:
 - There are no modifications to the external conditions of the optical fiber under test, i.e., no temperature change, mechanical stress or vibration
 - The OTDR acquisition conditions are the same, i.e., same pulse response and same central wavelength, spectral width and optical frequency components of the OTDR pulsed light source As will be described hereinbelow, OTDR traces acquired with different pulse responses may be corrected to have the same effective pulse responses by convoluting the OTDR trace that was acquired with the shorter pulse, with a corrective pulse response, in order to mimic such a longer pulse. For example, the OTDR trace that was acquired with the shorter pulse may be convoluted with the pulse response of the longer pulse, whereas the OTDR trace that was acquired with the longer pulse is convoluted with the pulse response of the shorter pulse.

As such, under conditions that are stable enough, each optical fiber has a unique signature and any backscattering pattern that is long enough can be used as a fiber signature.

There are therefore provided herein methods and systems for testing the continuity of optical fiber links under test and/or a fiber arrangement, polarity or mapping of optical fiber connections within multi-port optical devices under test using the backscattering pattern as a signature. The device under test may comprises a single fiber, a duplex link, a multifiber cable or another multi-port device such as a backplane device.

Effect of Laser Linewidth and Pulsewidth on the Backscattering Pattern:

As explained hereinabove, the pulse length T impacts the amplitude of the backscattering pattern as measured, and so is the laser linewidth.

The fraction ($f_{CRN}$) of the Coherent Rayleigh Noise (CRN) (inherent to the optical fiber) which manifests in the OTDR trace as a backscattering pattern and is available for use as a signature is defined as ratio of the standard deviation of the amplitude of the measured backscattering pattern to that of the Coherent Rayleigh Noise and is given as (see K De Souza, "Significance of coherent Rayleigh noise in fibre-optic distributed temperature sensing based on spontaneous Brillouin scattering", in *Measurement Science and Technology*, vol. 17, pp. 1065-1069, April 2006):

$$f_{CRN} \approx \left(\frac{V_g}{4\Delta z \Delta v}\right)^{1/2} \quad (4)$$

wherein $V_g$ is the group velocity, $\Delta z$ is the OTDR pulse length and $\Delta v$ is the laser linewidth.

Figure 2:
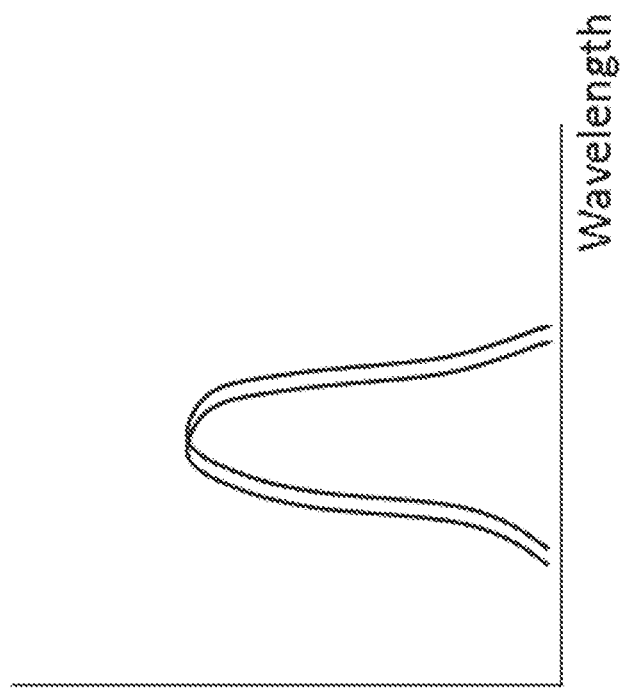
FIG. 2 is a graph illustrating a strong spectral overlap between the OTDR laser sources used in two OTDR acquisitions, which will yield a good signature correlation.
Figure 4:
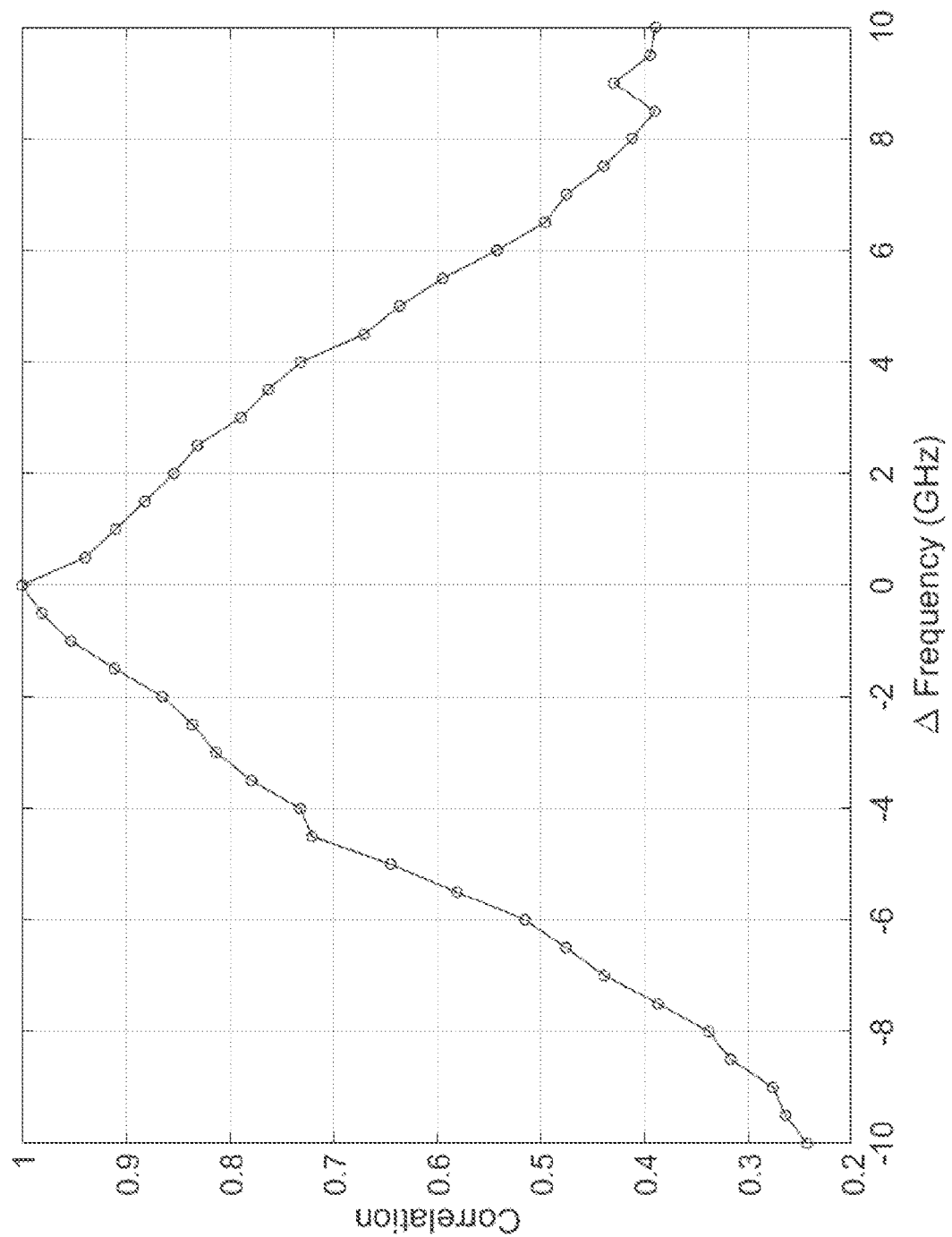
FIG. 4 is a graph showing how the correlation between measured backscattering patterns may drops as a function of a frequency offset of the OTDR laser sources.

This equation explains that the laser linewidth affects the measured backscattering pattern. Consequently, to recognize a signature under stable optical fiber conditions (no temperature change) the OTDR laser source of both measurements should have the same center wavelength and the same spectral width. But in reality, the signature correlation is proportional to the spectral overlap when assuming the fiber is not perturbed (temperature change, etc.). Referring to FIG. 2, a strong spectral overlap between the OTDR laser sources used in two OTDR acquisitions will yield a good signature correlation. Referring to FIG. 3, non-overlap of the spectral width will produce different signatures that will yield a low signature correlation and may not allow to recognize the optical fiber. FIG. 4 shows how the correlation between measured backscattering patterns may drop with a frequency offset of the OTDR laser source.

The reproducibility of backscattering patterns is therefore sensitive to the central wavelength and the spectral width of the OTDR laser source. Reproducibility may be improved by employing larger OTDR laser linewidth to reduce the signature variability that may be due to wavelength drift of the OTDR laser source. The spectral width of the source may be selected to be a few times larger (e.g., 5 to 10) than the expected wavelength stability. For example, if the source center wavelength can be stabilized to about ±1 GHz, the target spectral width of the OTDR laser source may be about 5 to 10 GHz.

From the above equation, the fraction $f_{CRN}$ of the Coherent Rayleigh Noise which manifests in the OTDR trace as a backscattering pattern is inversely proportional to the OTDR pulsewidth and the OTDR laser linewidth. The broader the pulsewidth and the larger the laser linewidth, the lower the amplitude of the measured backscattering pattern. A spectral width of the OTDR laser source that would be too large may therefore be detrimental because it would reduce the amplitude of the backscattering pattern. A balance may therefore have to be found between the amplitude of the measured backscattering pattern and its repeatability.

Temperature Variations:

Variations in the temperature of the receive fiber also modify the backscattering pattern.

Figure 5A:
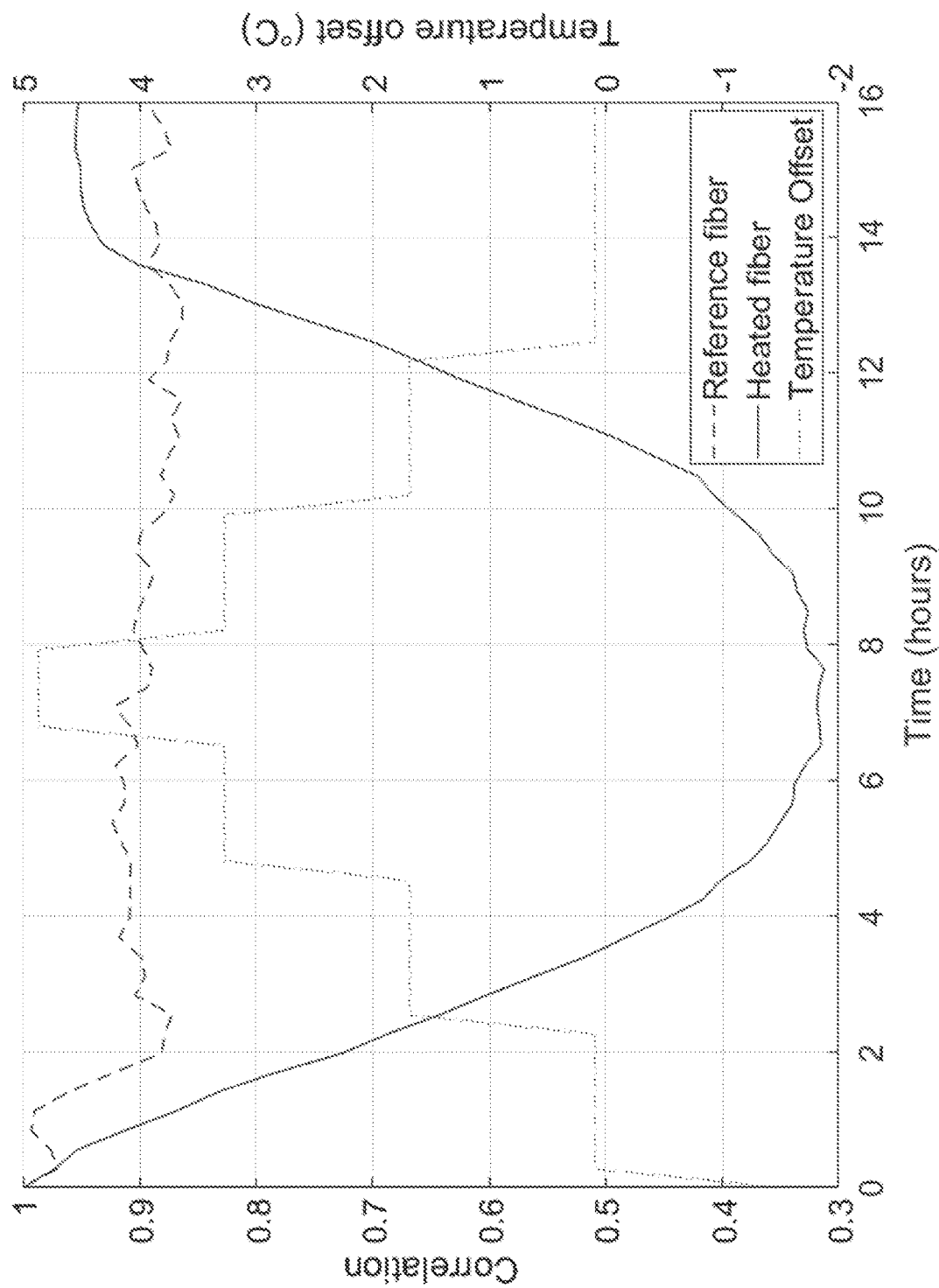
FIG. 5A is a graph showing experimental results in which, on the left scale, the correlation coefficient obtained by comparing backscattering patterns acquired over the same optical fiber, but which is subject to varying temperatures, wherein the temperature offset is shown on the right scale (varying from 0 to 5° C.).

Referring to FIG. 5A, it is shown that variations of the temperature of the optical fiber also modify the backscattering pattern. A correlation is calculated between a reference backscattering pattern obtained at reference temperature of 25° C. and backscattering patterns obtained with temperature variations from 0 to 5° C. It was found that the correlation is significantly weaker with greater temperature variations. This is explained by the refraction index which changes as a function of temperature, thereby modifying the delays between scatters and changing the backscattered light b(t). This change is similar to a scaling, i.e., a modification of the length of optical fiber.

Figure 5B:
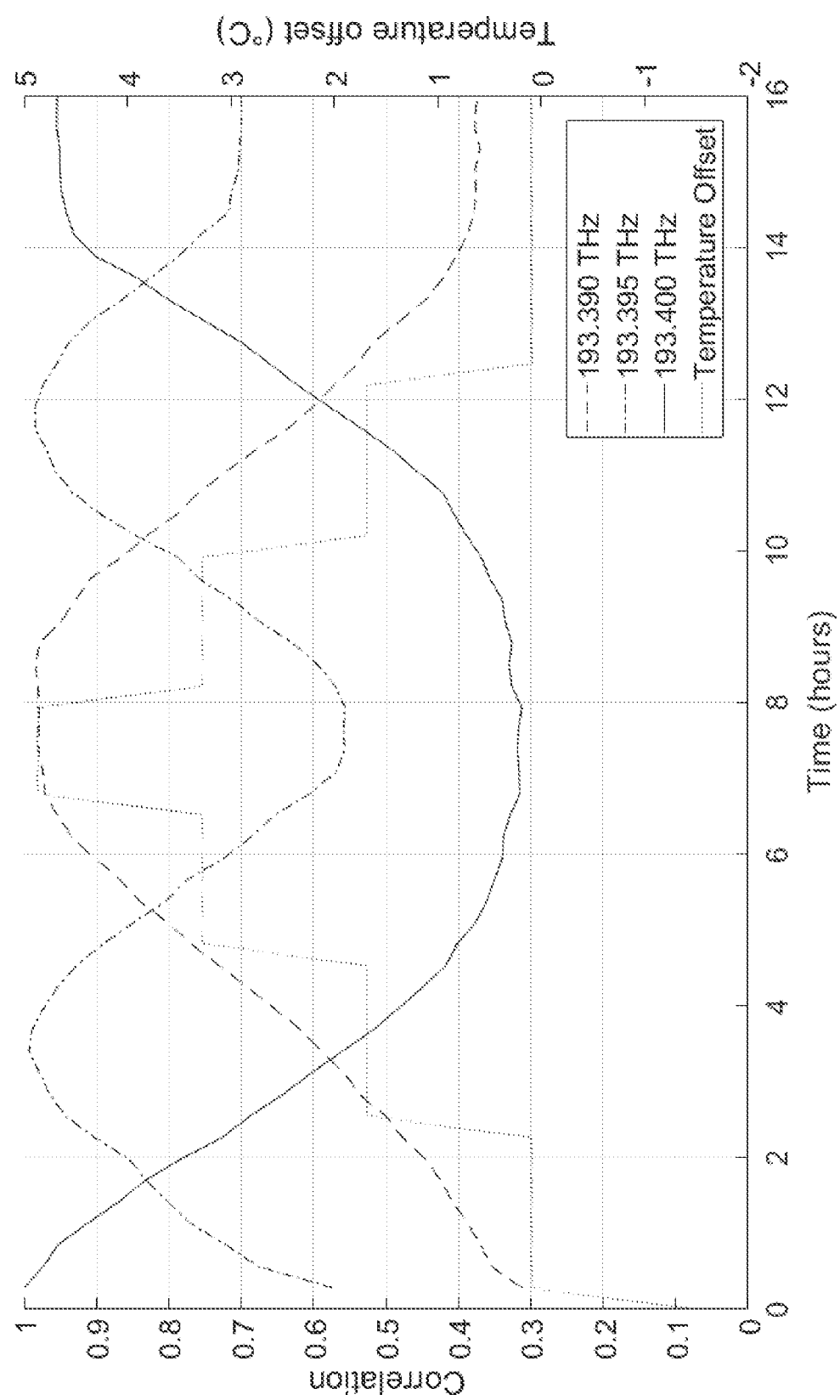
FIG. 5B is a graph showing experimental results for which backscattering patterns measured at different frequencies are compared to backscattering patterns obtained at a reference frequency of 193.4 THz, while progressively varying the temperature of the optical fiber, wherein the correlation coefficient is shown on the left scale and the temperature offset is shown on the right scale (varying from 0 to 5° C.).

FIG. 5B shows experimental results for which backscattering patterns measured at different frequencies are compared to backscattering patterns obtained at a reference frequency of 193.4 THz, while progressively varying the temperature of the optical fiber. The temperature offset is shown on the right scale (varying from 0 to 5° C.) and the correlation is shown on the left scale. The correlation vs the temperature for different frequency offsets shows that the temperature change can be compensated by offsetting the center frequency (or wavelength) of the OTDR laser source. For example, a −10 GHz offset brings a correlation close to 1 for a 5 C temperature offset.

Experiments have therefore shown that a change in the center wavelength of the OTDR laser source is substantially equivalent on the backscattered light b(t) to a change in the optical fiber temperature. Therefore, slightly tuning the laser source wavelength may allow to recover the backscattering pattern obtained at a different temperature. The pattern observed at fiber temperature T1 and wavelength λ1 can be reproduced at fiber temperature T2 and wavelength λ2, wherein T1≠T2 and λ1≠λ2.

Figure 6:
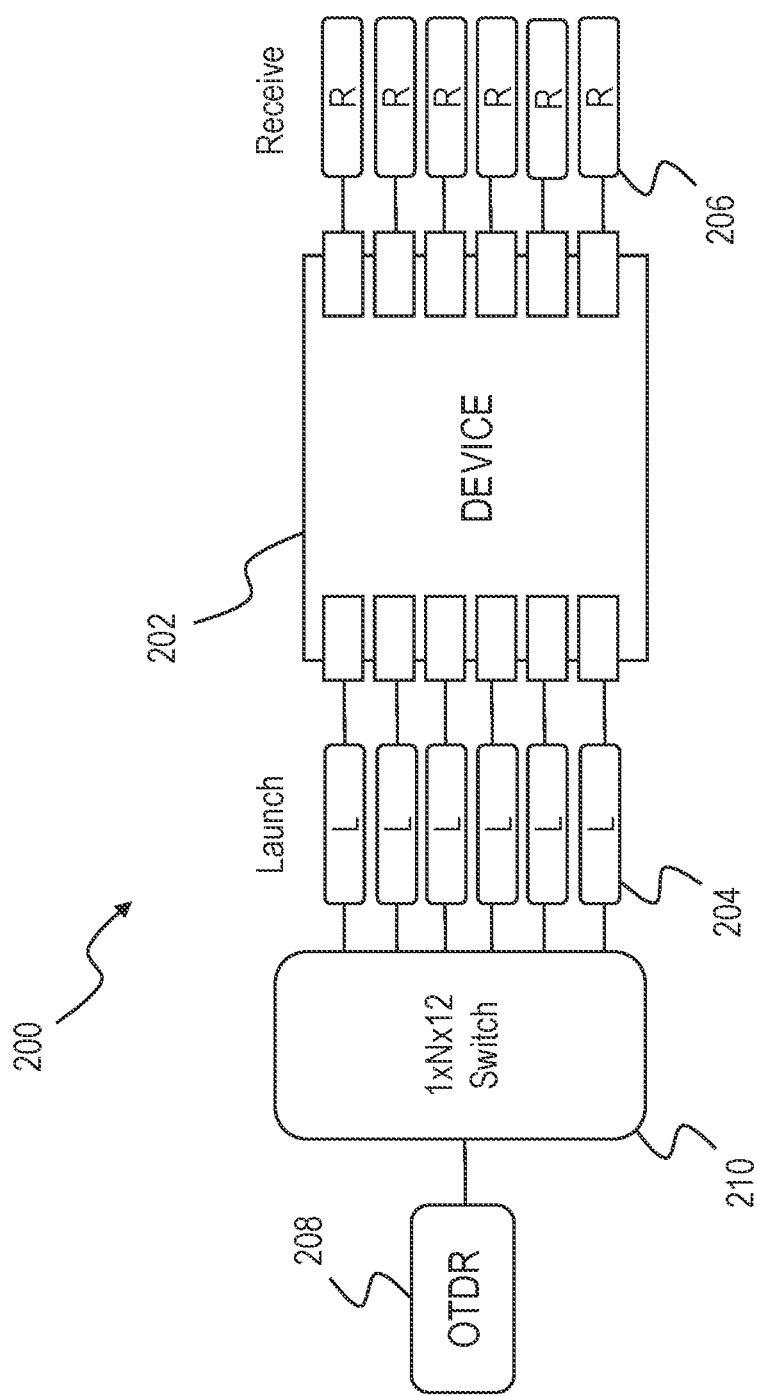
FIG. 6 is a schematic showing a system for testing a multi-port device under test such as a multifiber cable or device, in accordance with one embodiment and wherein the system is shown as connected to the multi-port device under test in a testing configuration.

Test Method:

Now referring to FIG. 6, there is shown a system 200 for testing a multi-port device under test 202 such as a multifiber cable or device, without using discrete receive signatures. The device 202 under test comprises a plurality of optical fiber links each connected between an input port and an output port, according to a given fiber arrangement, i.e., a given mapping between input and output ports. In some applications, the fiber arrangement may be unknown and need to be determined.

Each input port of the device 202 under test is connected to a launch fiber 204 and each output port is connected to a receive fiber 206. The system 200 comprises an OTDR device 208 which test signal may be launched in sequence toward each input port of the device 202 under test using an optical switch 210. The optical switch is optional. It is used to automate and accelerate the test. Of course, in other embodiments, the OTDR device 208 may also be manually connected toward each input port. For example, one may connect the OTDR device 208 to each input port using a same and single launch fiber 204.

Herein, the launch fibers 204 and the receive fibers 206 can be made of continuous sections of standard optical fibers such as SMF-28. There is no need for additional discrete reflective events to produce a signature because backscattering patterns appearing in the acquired OTDR traces are used as signatures.

It will be understood that if the device under test is a multifiber cable, the input ports of each of the plurality of optical fiber links of the multifiber cable can be together provided on a multifiber connector. The same also applies to the output ports. The launch and receive fibers can also be provided respectively as a multifiber launch cable and a multifiber receive cable.

Figure 7:
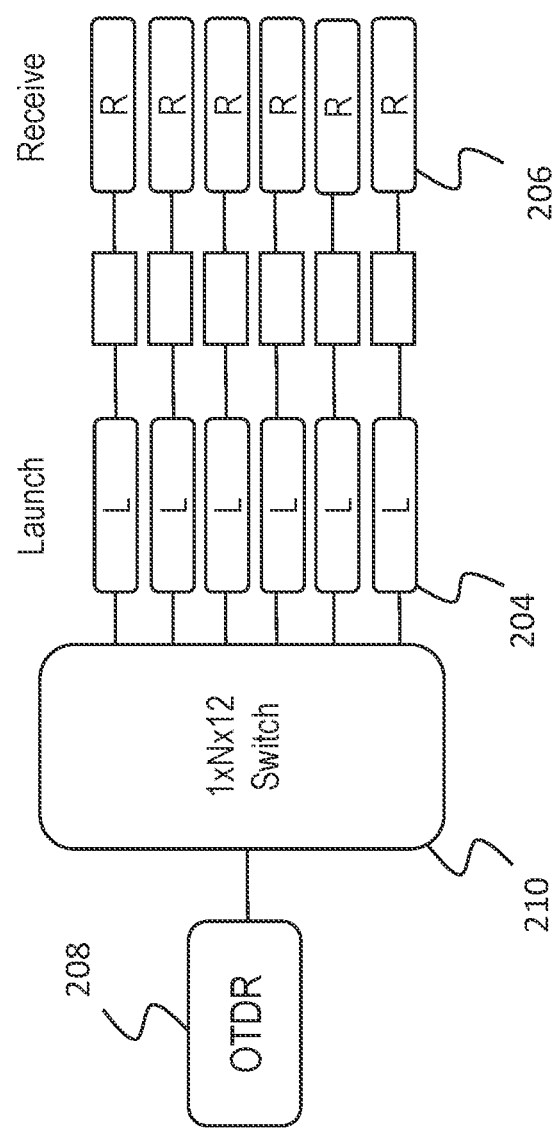
FIG. 7 is a schematic showing the system of FIG. 6 wherein the system is shown as connected in a characterization configuration for characterizing the signatures of the receive fibers.

Before the signature can be recognized in the OTDR traces acquired with the system of FIG. 6, the signatures need to the characterized. FIG. 7 illustrates a setup that can be used for such characterization. The signatures are characterized by performing at least one OTDR acquisition towards each input port. The backscattering pattern corresponding to each receive fiber may then be extracted from the OTDR trace and recorded as its signature.

Then, in the setup shown in FIG. 6, when the device under test 202 is inserted between the launch and receive fibers, test system 200 may launch an OTDR acquisition in any selected switch port (e.g., ID A) toward a given optical fiber link of the device 202. Then, by recognizing in the acquired OTDR trace, the signature of any one of the receive fibers 206, the system 200 can confirm a continuity of the given optical fiber link. It may further identify the position of the output port (e.g., ID B) to which the given optical fiber link is connected. By repeating this process toward each input port, the fiber arrangement within the device 202 may also be determined.

Optional Temperature Correction:

The test methods proposed herein may optionally involve a correction to compensate for temperature-induced changes of the backscattering pattern. Such temperature correction may take advantage of the above-described behavior to manage temperature variations of the receive fibers.

In accordance with a first strategy, the stored signature for each receive fiber comprises a set of backscattering patterns measured at different temperature set points over a range of temperatures and/or a set of backscattering patterns measured for different slightly drifted center wavelengths of the OTDR laser source over a range of center wavelengths. An optical fiber signature to be recognized comprises a backscattering pattern acquired at any temperature within the range and potentially using a slightly drifted center wavelength of the OTDR laser. The signature can then be recognized by comparing its backscattering pattern to each prerecorded backscattering pattern of the set of recorded signatures to find a match. The backscattering pattern is recognized when a correlation is found with any one of the backscattering patterns of a given signature.

In this case, a previous signature characterization step may be required in order to record the stored signature(s). OTDR acquisitions are performed over each receive fiber to be recognized for varying OTDR laser center wavelengths $\mu_n$, in order to simulate a laser or temperature drift. The wavelength range over which to characterize each optical fiber may correspond to the desired operating temperature range (e.g., 23° C.±5° C.), the wavelength dependency being around 1 GHz/° C. For example, the laser wavelength steps to enable pattern interpolation and matching may be around ¼ of the OTDR laser spectral width (e.g., about 1 GHz for a laser spectral width of 4 GHz).

In accordance with a second strategy, the stored signature for each receive fiber comprises a single backscattering pattern acquired at a single temperature and single center wavelength of the OTDR laser source (or a limited number of backscattering patterns). Then, when later trying to recognize a backscattering pattern, if the backscattering pattern does not match any of the stored signatures, OTDR acquisitions are repeated with slightly drifted center wavelengths of the OTDR laser source to obtain a set backscattering patterns for the receive fiber to be recognized. The comparison process is repeated until a match is found with any of the stored signatures. The receive fiber is recognized when a match is found.

In some conditions, an OTDR laser source equipped with a thermoelectric cooler or similar device may provide enough tuning range to cover expected fiber temperature variation. In other embodiments, the OTDR device may comprise a tunable laser. The tuning range required will depend on the temperature range of the fiber that needs to be covered.

It should be noted that, in some controlled environments, such as manufacturing facilities or labs, such special care to account for temperature variations may not be needed to obtain repeatable signature patterns. Only conventional thermal stabilization of the OTDR light source (so as to minimize the wavelength drift of the OTDR laser source over the complete OTDR test procedure) may be found sufficient. Stability may also be obtained by employing adequate OTDR laser linewidth to reduce the signature variability that is due to wavelength drift of the OTDR laser source.

Figure 8:
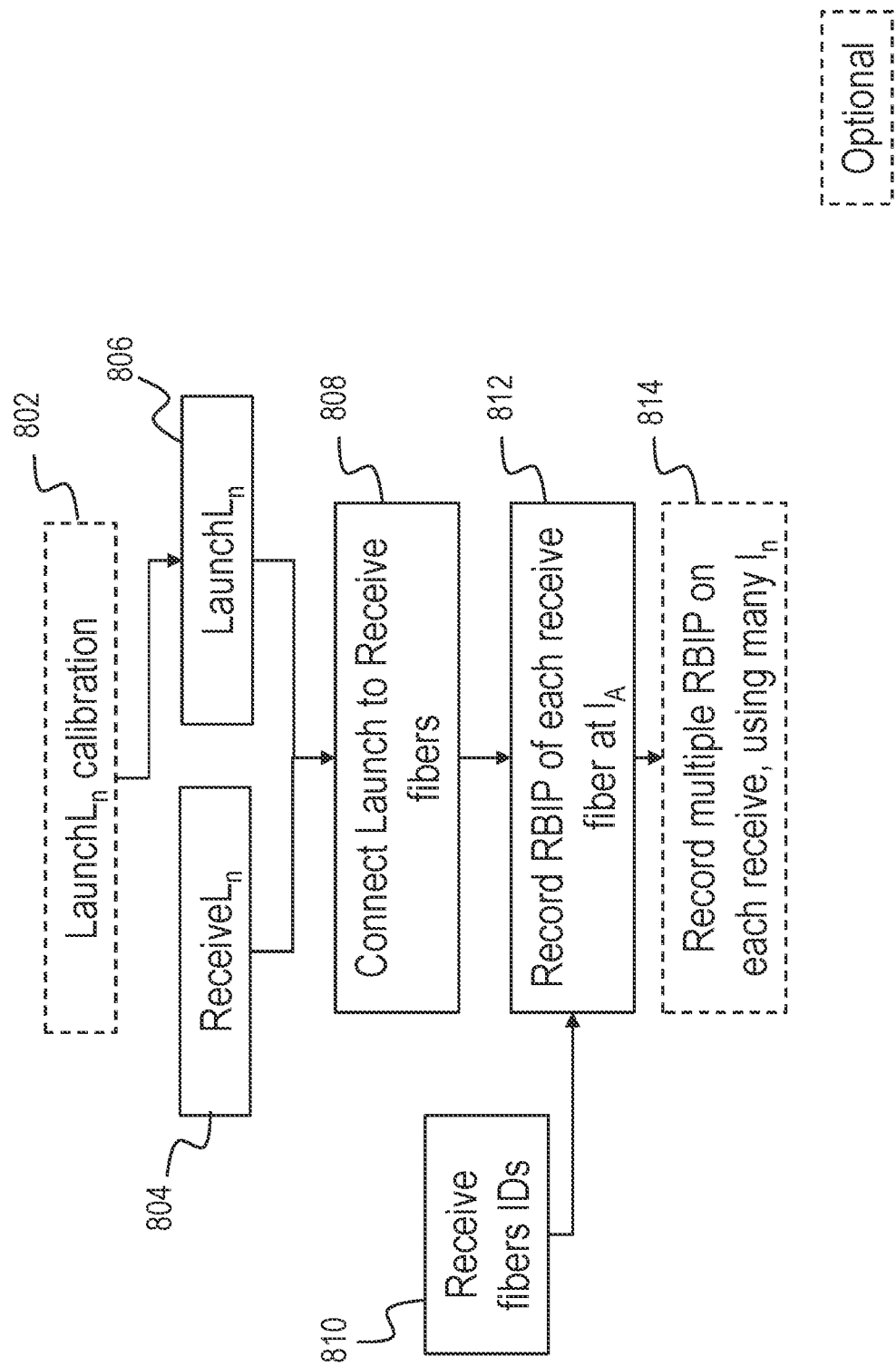
FIG. 8 is a flow chart illustrating a method for characterizing signatures of the receive fibers, in accordance with one embodiment.

Signature Characterization:

FIG. 8 illustrates a method for characterizing signatures of the receive fibers 206, in accordance with one embodiment. The method may be implemented by connecting the launch and receive fibers as illustrated in FIG. 7.

A step 802 of calibrating the length of each launch fiber (LaunchLn) is optional because it is relatively easy to ensure that launch fibers all have the same nominal length within about ±1 m to avoid individual length calibrations. Launch fiber lengths (LaunchLn) and receive fiber lengths (ReceiveLn) may be input to the test system in steps 804 and 806 based on their nominal values.

In step 808, a user connects the launch and receive fibers in pair as in FIG. 7.

In step 810, the test system may receive an identification code (ID) for each receive fiber 206, in association with output ports of the optical switch 210. For example, receive fiber may be associated with an identification label marked on the actual receive fiber. Such identification labels can be manually input to the system or be read using a photo camera or bar code reader for example. Otherwise, the test system may arbitrarily or incrementally assign an identification code to each receive fiber 206.

In step 812, the test system performs an OTDR acquisition toward each output port of the optical switch to obtain an OTDR trace representing backscattered and reflected light as a function of distance in the optical fiber link under test. The backscattering pattern corresponding to each receive fiber may be extracted from the OTDR trace by cropping the OTDR trace to retain only the portion corresponding to the receive fiber, based, e.g., on the launch and receive fiber lengths (LaunchLn, ReceiveLn). Each thereby obtained backscattering pattern is recorded along with its associated identification code.

It should be noted that these recorded backscattering patterns represent unique signatures for each receive fiber but that these signatures are only valid for the receive fiber temperature and the OTDR source center wavelength $\lambda_A$ at which the characterization was performed. At measurement time, the receive fiber temperature or OTDR laser center wavelength could change.

The method may thus comprise an optional step 814 of repeating step 812 for varying OTDR laser center wavelengths $\lambda_n$, in order to simulate a laser or temperature drift. The wavelength range over which to characterize each receive fiber may correspond to the desired operating temperature range (e.g., 23° C.±5° C.), the wavelength dependency being around 1 GHz/° C. The laser wavelength steps to enable pattern interpolation and matching may be around % of the OTDR laser spectral width (e.g., about 1 GHz for a laser spectral width of 4 GHz).

DUT Measurement:

Once the signature of each receive fiber is characterized, a test method for testing fiber link continuity goes as follows, using the test setup of FIG. 6 for example.

In short, an OTDR acquisition is performed toward an optical fiber link to be tested (e.g., one of the links of the DUT 202 of FIG. 6). The test system then searches in the acquired OTDR trace, for one backscattering pattern among the set of recorded backscattering patterns for each pre-characterized receive fiber 206, in order to determine if the receive fiber of the optical fiber link under test matches one of the pre-characterized receive fibers. If a match is found with any of the pre-characterized receive fibers (i.e. any of the pre-recorded backscattering patterns), a link continuity of the optical fiber link under test is confirmed. Optionally, the fiber arrangement of the optical fiber link under test within the multi-fiber device 202 may be determined from the ID of the matching receive fiber. Of course, optionally, the length and the insertion loss of the optical fiber line under test may be derived from the OTDR trace, as known in the art. The process can be repeated for each optical fiber link of the device 202 under test.

Furthermore, to account for temperature variations, if the recorded signature for each receive fiber comprises a plurality of backscattering patterns obtained for different values of optical fiber temperatures or different values of OTDR laser center wavelengths, the process may search to find a match between the measured backscattering pattern for the optical fiber link under test and any of the recorded backscattering patterns. If a match is found with any of the pre-characterized backscattering pattern, a link continuity of the optical fiber link under test is confirmed and, optionally, the fiber arrangement of the optical fiber link under test within the multi-fiber device 202 may be determined.

Figure 9:
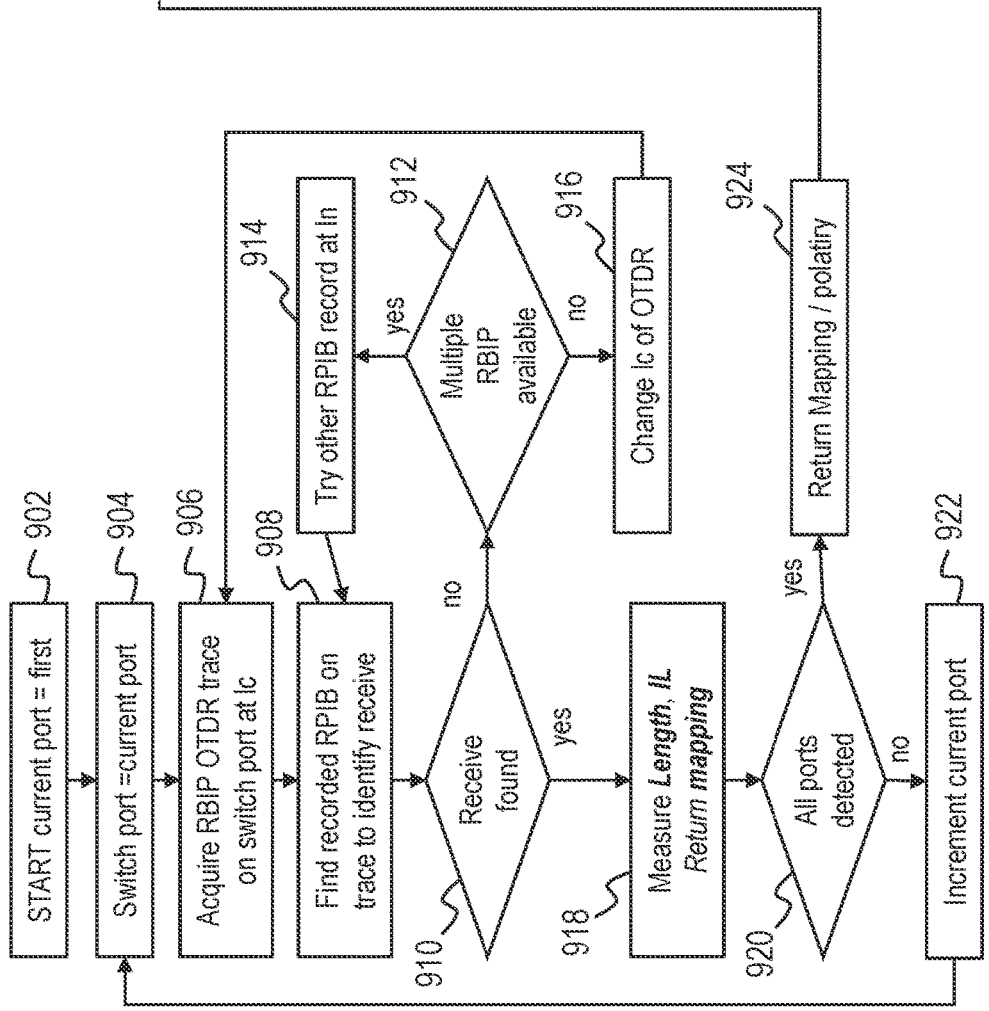
FIG. 9 is a flow chart illustrating a method for testing a multi-port device under test, in accordance with one embodiment.

Now referring to FIG. 9, an example algorithm for the test method is described in more detail, referring again to the test setup of FIG. 6.

In step 902, the algorithm starts. The "next port" index is set to the first input port (e.g. port 1). In step 904, a command is sent to the optical switch 210 to set its test port to "next port".

In step 906, an OTDR acquisition is launched on the selected port of the optical switch 210, i.e., toward the optical fiber link of the DUT 202 that is connected to the "next port". The center wavelength of the OTDR laser source is $\lambda c$.

The OTDR acquisition parameters may be manually selected or automatically selected from input parameters and some parameters be fixed (hard-coded or set by hardware), taking into account the following considerations:

The OTDR pulse width should be selected so as to provide enough signature features along the receive fiber, to make it unique. For example, the OTDR pulse width may be selected to be at least 15 times smaller than the length of the receive fiber.

The OTDR dynamic range should be large enough to provide enough signal to noise ratio on the receive fiber to allow backscattering pattern recognition. For example, the OTDR acquisition parameters may be selected to provide a dynamic range that is at least 12 dB greater than the combined maximum expected insertion loss of the optical switch 210, launch fiber 204, DUT 202 and receive fiber 206.

The OTDR acquisition parameters may be selected to provide a short averaging time so as to minimize the effect of a temperature drift during measurement.

The spectral width of the OTDR laser source should provide enough amplitude in backscattering pattern features to produce unique and recognizable backscattering patterns. A spectral width of about 2 to 5 GHz was found to be adequate for most applications.

In step 908, the algorithm searches in the acquired OTDR trace, for one backscattering pattern among the set of recorded backscattering patterns for each pre-characterized receive fiber 206.

In 910, if no recorded backscattering pattern is found in the acquired OTDR trace and if, in 912, multiple backscattering patterns were recorded for varying wavelengths $\lambda n$, then, in 914, the algorithm searches in the acquired OTDR trace, for backscattering patterns recorded for such varying wavelengths $\lambda n$. If, in 912, no multiple backscattering patterns were recorded for varying wavelengths $\lambda n$, then in 916, the center wavelength $\lambda c$ of the OTDR laser source may be tuned (about ¼ of the spectral width of the OTDR lase source) to try to compensate for the temperature variation in the receive fiber and steps 906, 908 and 910 be repeated.

When a match is found, the center wavelength $\lambda c$ may be kept for the next acquisitions as it may be assumed that the temperature is the same for all receive fibers.

If no match is still found, link continuity cannot be confirmed, and an error status is returned and displayed in the OTDR user interface.

In step 918, once the receive fiber is matched, the length and the insertion loss of the optical fiber link under test may be determined and output. More specifically, the insertion loss may be determined using the Rayleigh backscattering levels of the launch and receive fibers, as known in the art. The length may be determined by subtracting the launch and receive fiber length to the total length measured, as also known in the art. The mapping between the switch port ("next port") and the identification number of the matching receive fiber is saved in memory.

In 920, if not all ports were tested, in 922 the "next port" index is incremented and steps 904, 906, 908, 910 and 918 are repeated for the corresponding optical fiber link.

If all ports were tested, in step 924, the fiber mapping or the corresponding polarity (A, B or C) may be output.

Optionally, in steps 926, 928, 930, 932, 936, 938, additional OTDR acquisitions may be performed toward each port of the optical switch 210 in order to better assess the discrete reflectances caused by events along the link (e.g., splices, connectors), the optical return loss and the insertion loss of each of the multiple optical fiber links of the DUT 202, for all relevant test wavelengths (e.g., 1310 nm and 1550 nm). In this embodiment, these steps are advantageously performed only after the backscattering pattern acquisition steps are completed (steps 904, 906, 908, 910, 912, 914, 916, 920, 922) in order to minimize the elapsed time, and so the temperature shift, during these acquisitions.

In step 926, the "next port" index is set to the first port (e.g. port 1) and a command is sent to the optical switch 210 to set its test port to "next port".

In step 928, OTDR acquisitions are launched on the selected port of the optical switch 210, i.e., toward the optical fiber link of the DUT 202 that is connected to the "next port", for testing discrete reflectances and the overall optical return loss all relevant test wavelengths.

New OTDR acquisition parameters may be adequately selected to allow characterization of individual events along the optical fiber link under test. Smaller pulses may allow better isolation of closely spaced events.

In step 930, from the OTDR traces acquired in step 928, the optical fiber link under test is characterized, including discrete reflectances and optical return loss.

In step 932, other OTDR acquisitions may be launched on the selected port of the optical switch 210, i.e., toward the optical fiber link of the DUT 202 that is connected to the "next port", for specifically measuring the insertion loss at all relevant test wavelengths. New OTDR acquisition parameters may be selected to target the overall insertion loss of the optical fiber link.

In 934, if not all ports were tested, in 936 the "next port" index is incremented and steps 926, 928, 930 and 932 are repeated for the corresponding optical fiber link.

In 938, the algorithm ends when all ports were tested. The reflectances, optical return loss, insertion loss as measured for all relevant wavelengths are output, as well as the fiber arrangement between the multiple inputs and outputs of the DUT 202.

Figure 10:
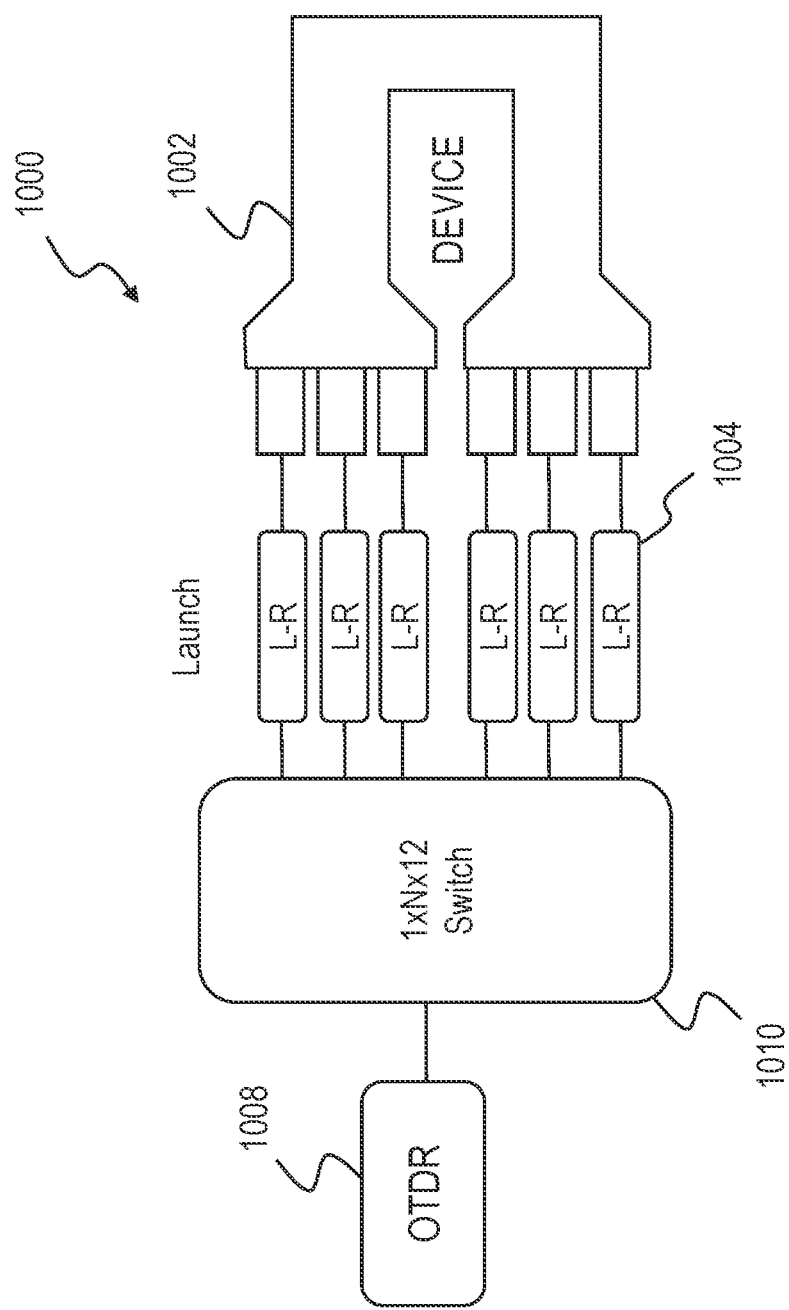
FIG. 10 is a schematic showing a system for testing a multi-port device under test, in accordance with one embodiment in which the device under test is connected in loopback.
Figure 11:
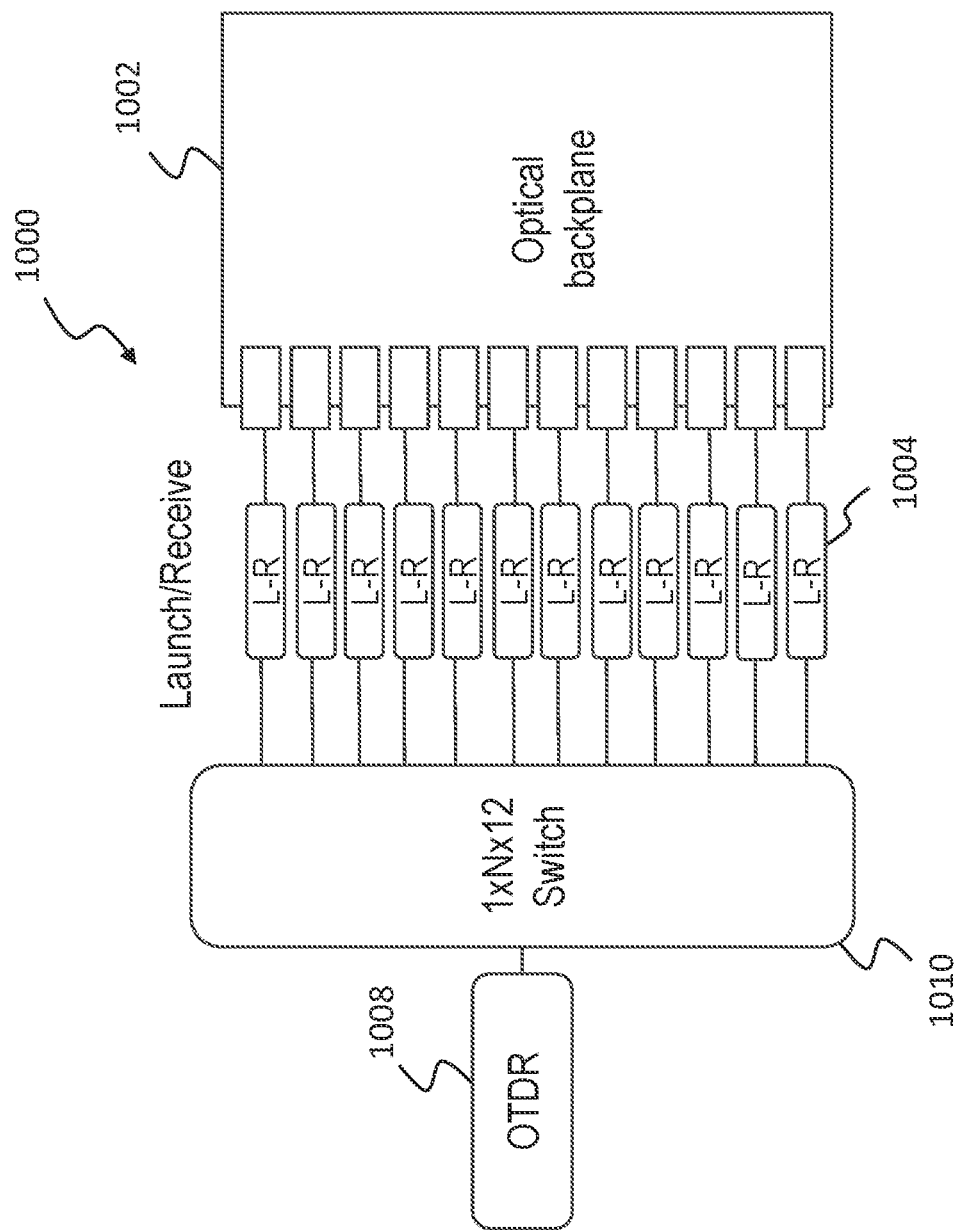
FIG. 11 is a schematic showing a system for testing a multi-port device under test, in accordance with another embodiment in which the device under test comprises an optical backplane.

Loopback Devices:

Now referring to FIGS. 10 and 11, there is shown a system 1000 for testing a multi-port device under test 1002, such as a multifiber cable or device, in which the DUT 1002 is connected in loopback, allowing OTDR acquisitions towards all ports of the DUT 1002 using one OTDR device 1008 and one optical switch 1010. In the system 1000, by performing OTDR acquisitions toward each port of the DUT 1002, bidirectional OTDR measurements are obtained for each optical fiber links of the DUT 1002.

It is noted that bi-directional OTDR analysis may be used to average the results of single-ended OTDR measurements performed via opposite ends of an optical fiber link to better characterize events identified along the link. Bi-directional OTDR analysis advantageously allows to mitigate any insertion loss measurement bias that may be due to varying backscattering characteristics of optical fibers along the optical fiber link.

In the configuration of FIGS. 10 and 11, the near-end portion of the OTDR trace acquired in the backward direction may also be used to characterize a signature that is to be identified in the far-end portion of the OTDR trace acquired in the forward direction. In such OTDR measurement process, the backward OTDR trace is used as a reference measurement to characterize the signature to be identified in the forward OTDR trace. There is therefore no need for a prior reference measurement characterizing all signatures. If the whole OTDR measurement process that acquires forward and backward traces can be completed in a short enough time, the fiber temperature and the center wavelength of the OTDR laser source may be assumed to remain stable and the backscattering patterns may remain sufficiently stable for detection without temperature correction or center wavelength correction.

A launch/receive fiber 1004 is connected to each input port of the DUT 1002. Each launch/receive fiber 1004 is measured in forward direction as a launch fiber and in the backward direction as a receive fiber. Matching then requires reversing the backscattering pattern of the launch fiber 1004 in the forward OTDR trace, to find it as a receive fiber in the backward OTDR trace. Details on how to reverse the backscattering pattern are described herein below.

In short, OTDR acquisitions are performed toward each optical fiber links of the DUT 1002 to be tested. The test system then extracts from the OTDR traces, first backscattering patterns corresponding to a portion of the OTDR trace, typically acquired over the near end span of the link (or, alternatively, the far end of the link (receive fiber)). The test system then searches in the acquired OTDR traces, typically corresponding to the far end span of the link (or, alternatively, the near end of the link) for extracted first backscattering patterns. If a match is found, the matching OTDR traces are found to be acquired toward opposite ports of a same optical fiber link of the DUT 1002 and a link continuity is confirmed.

It should be noted that, in the case of loopback DUTs, the backscattering pattern need not be extracted from the portion of the OTDR trace corresponding to the launch/receive fiber span. In fact, it can be extracted from any part of the OTDR trace, including a fiber span along the optical fiber link of the multi-port device under test if the links are sufficiently long to produce recognizable signatures.

Figure 12:
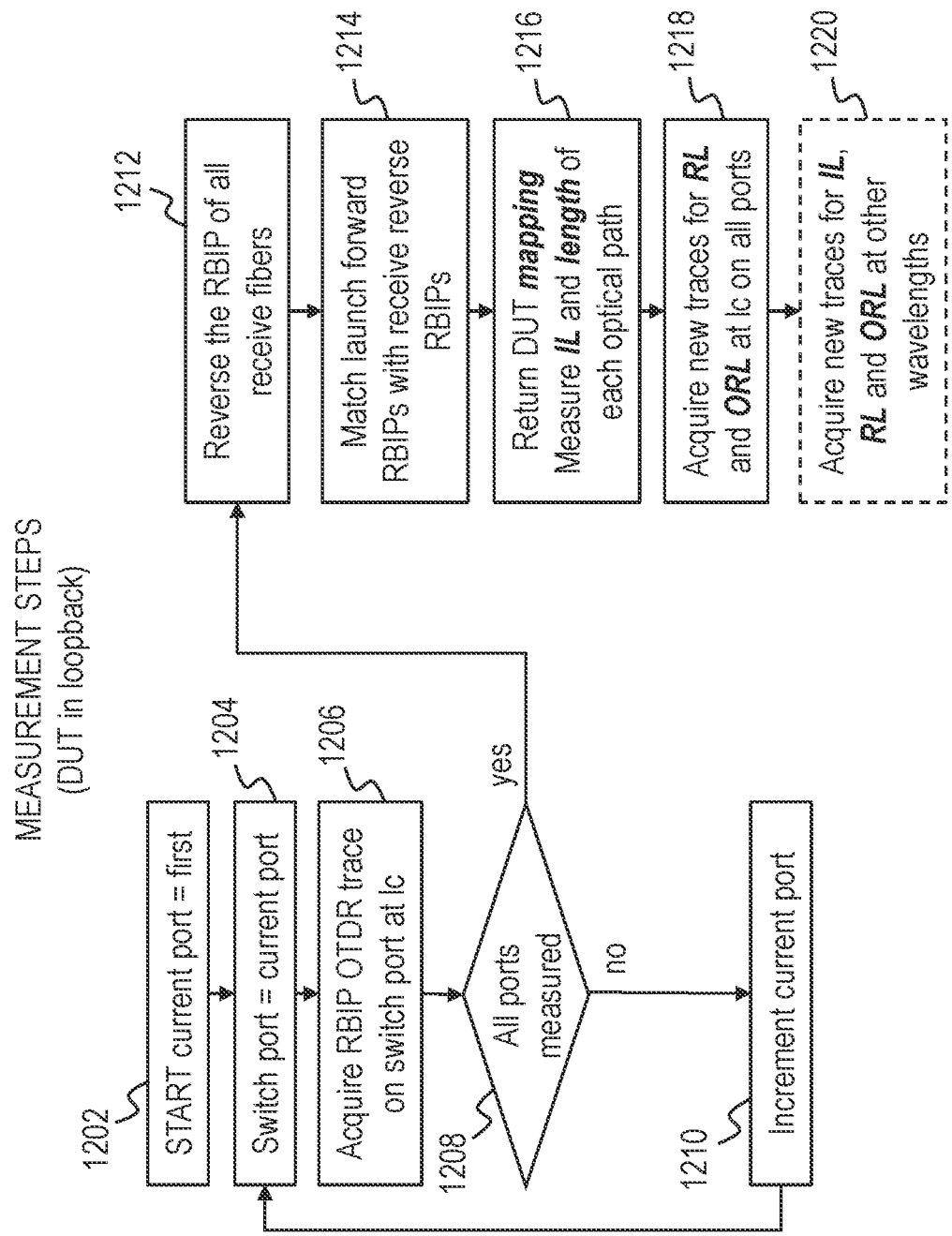
FIG. 12 is a flow chart illustrating a method for testing a multi-port device under test, in accordance with one embodiment wherein the device under test is connected in loopback.

Now referring to FIG. 12, an example algorithm for the test method as applicable to a loopback DUT 1002 is described in more detail, referring to the test setup of FIGS. 10 and 11.

In step 1202, the algorithm starts. The "current port" index is set to the first port (e.g., port 1). In step 1204, a command is sent to the optical switch 1010 to set its test port to "current port".

In step 1206, an OTDR acquisition is launched on the selected port of the optical switch 1010, i.e., toward the input port of the DUT 202 that is connected to the "current port". The center wavelength of the OTDR laser source is λc.

As described with reference to FIG. 9, the OTDR acquisition parameters may be manually selected or automatically selected from input parameters and some parameters be fixed (hard-coded or set by hardware), taking into account the considerations exposed hereinabove with reference to FIG. 9.

In 1208, if not all ports were tested, in 1210 the "current port" index is incremented and steps 1204, 1206 and 1208 are repeated for the corresponding optical port.

If all ports were tested, the mapping process begins in step 1212, where the backscattering patterns corresponding to the far end span of the link (i.e., the receive fiber portion), are extracted from each OTDR trace acquired in step 1206 and reversed.

In step 1214, the algorithm searches in each acquired OTDR trace, i.e., along the portion corresponding to the near end span of the link (i.e., the launch fiber portion) for one backscattering pattern among the set of backscattering patterns extracted and reversed in step 1212.

In step 1216, once all ports are matched, the mapping between ports of the DUT 1002 can be determined from the matches and output. The insertion loss and the length of each optical fiber links may also be derived and output.

Optionally, in step 1218, additional OTDR acquisitions may be performed toward each port of the optical switch 1010 in order to better assess the discrete reflectances caused by events along the link (e.g., splices, connectors) and the overall optical return loss of each optical fiber links of the DUT 1002.

Optionally, in step 1220, additional OTDR acquisitions may be performed to characterize discrete reflectances, discrete insertion losses of events, the optical return loss and the insertion loss for all other relevant wavelengths (e.g., 1310 nm and 1550 nm).

It should be understood that, in other embodiments, the backscattering pattern extracted in step 1212 may correspond to the near end portion of the OTDR trace (i.e., launch fiber) and compared in step 1214 to the far end portion of the OTDR trace (i.e., receive fiber).

Figures 13A, 13B, 13C:
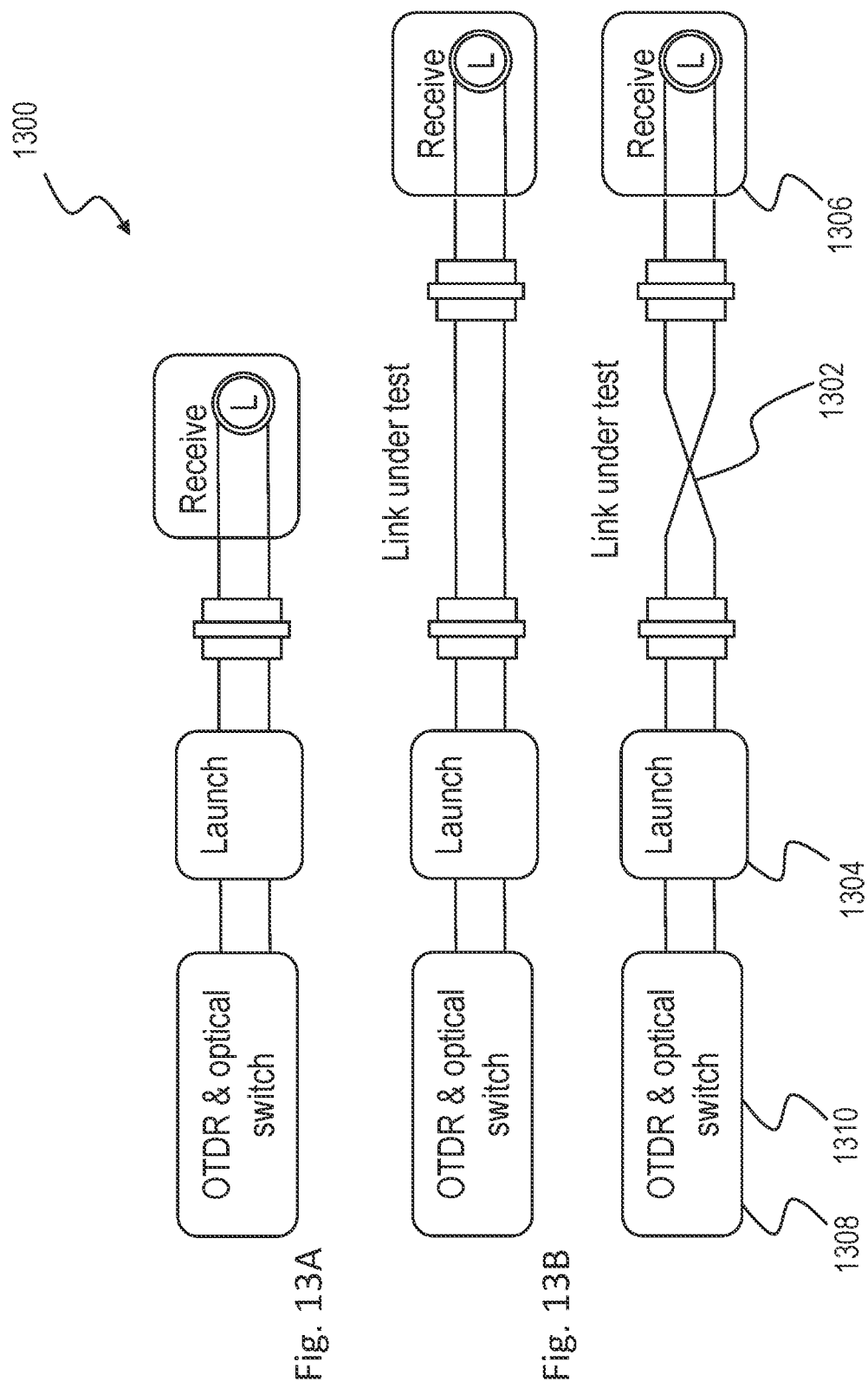
FIG. 13A shows the system as connected in a characterization configuration for characterizing the signatures of the receive fiber.
FIG. 13B shows the system as connected to a duplex link under test having a direct-polarity.
FIG. 13C shows the system as connected to a duplex link under test having a cross-connect-polarity.

Duplex Links:

It is noted that the same method also applies for testing the polarity of duplex links. Referring to FIG. 13, there is shown a system 1300 for testing a duplex link under test 1302. In this case, the receive fiber is connected in loopback at the far end of the duplex link 1302. As illustrated in FIG. 13, the signature of the receive fiber 1306 is first characterized using the setup illustrated in FIG. 13A. Then, in the setup shown in FIG. 13B or FIG. 13C, when the device under test 1302 is inserted between the launch and receive fibers, test system 1300 may launch an OTDR acquisition toward each input port of the device 1302. Then, by recognizing in the acquired OTDR trace, the signature of the receive fiber 1306, the system 200 can confirm a continuity of the links. It may further determine the polarity (direct or cross-connect). A direct polarity (see FIG. 13B) is found if the backscattering pattern is recognized as in the reference and a cross-connect polarity (see FIG. 13C) is found if a reversed backscattering pattern is recognized.

It is noted that OTDR acquisitions may be performed toward a single port of the duplex link and the second OTDR acquisition be avoided. In the OTDR acquisition performed toward the duplex link under test, if the reference backscattering pattern is directly found, the duplex link is of direct polarity, and if the reference backscattering pattern is found as reversed, the duplex link is of cross-connect polarity.

Figure 14A:
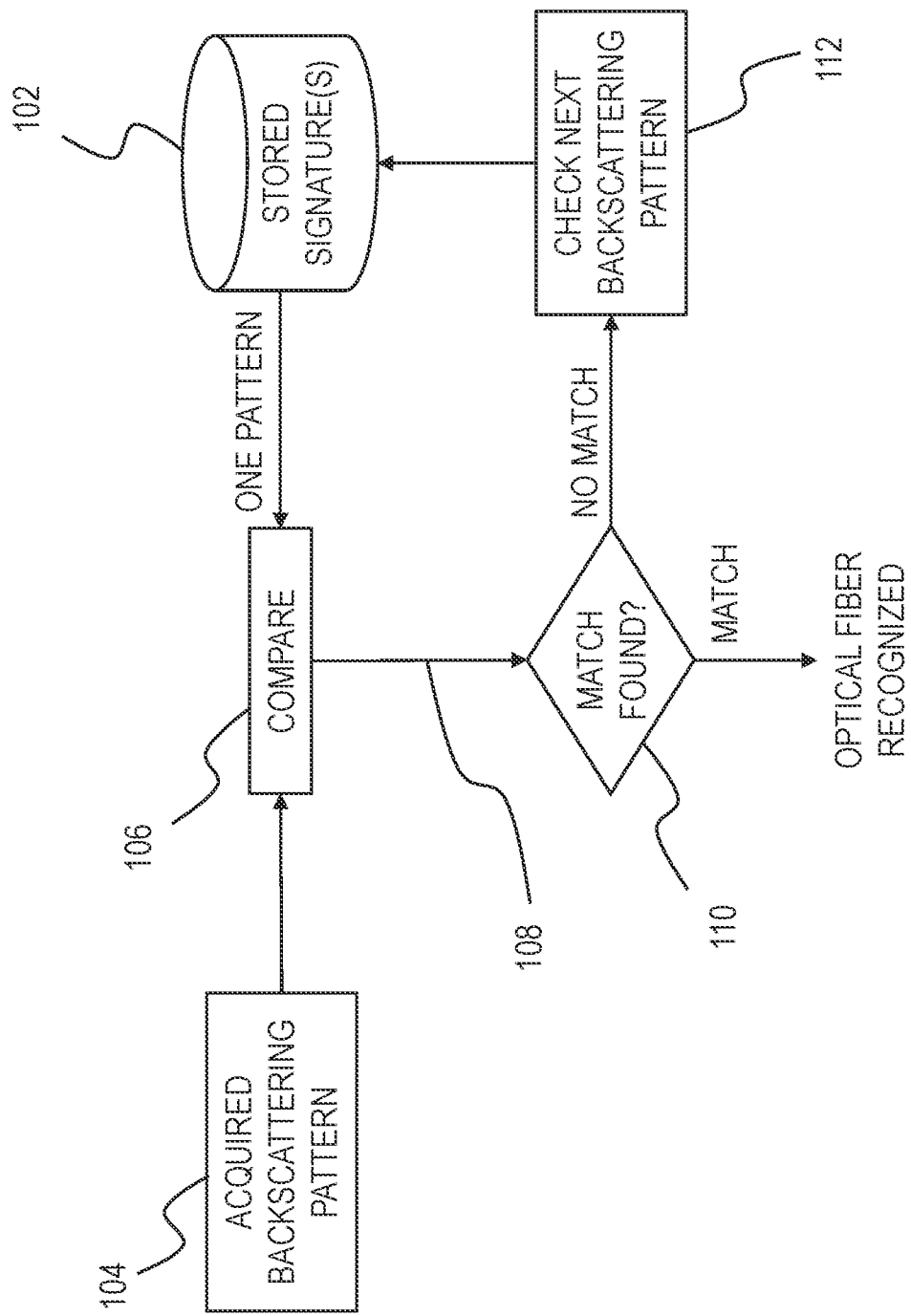
FIG. 14A is flowchart illustrating methods and systems for comparing OTDR signatures to recognize an optical fiber, in accordance with one embodiment wherein the stored signature for each receive fiber comprises a set of backscattering patterns measured at different temperature set points or for different slightly drifted center wavelengths.
Figure 14B:
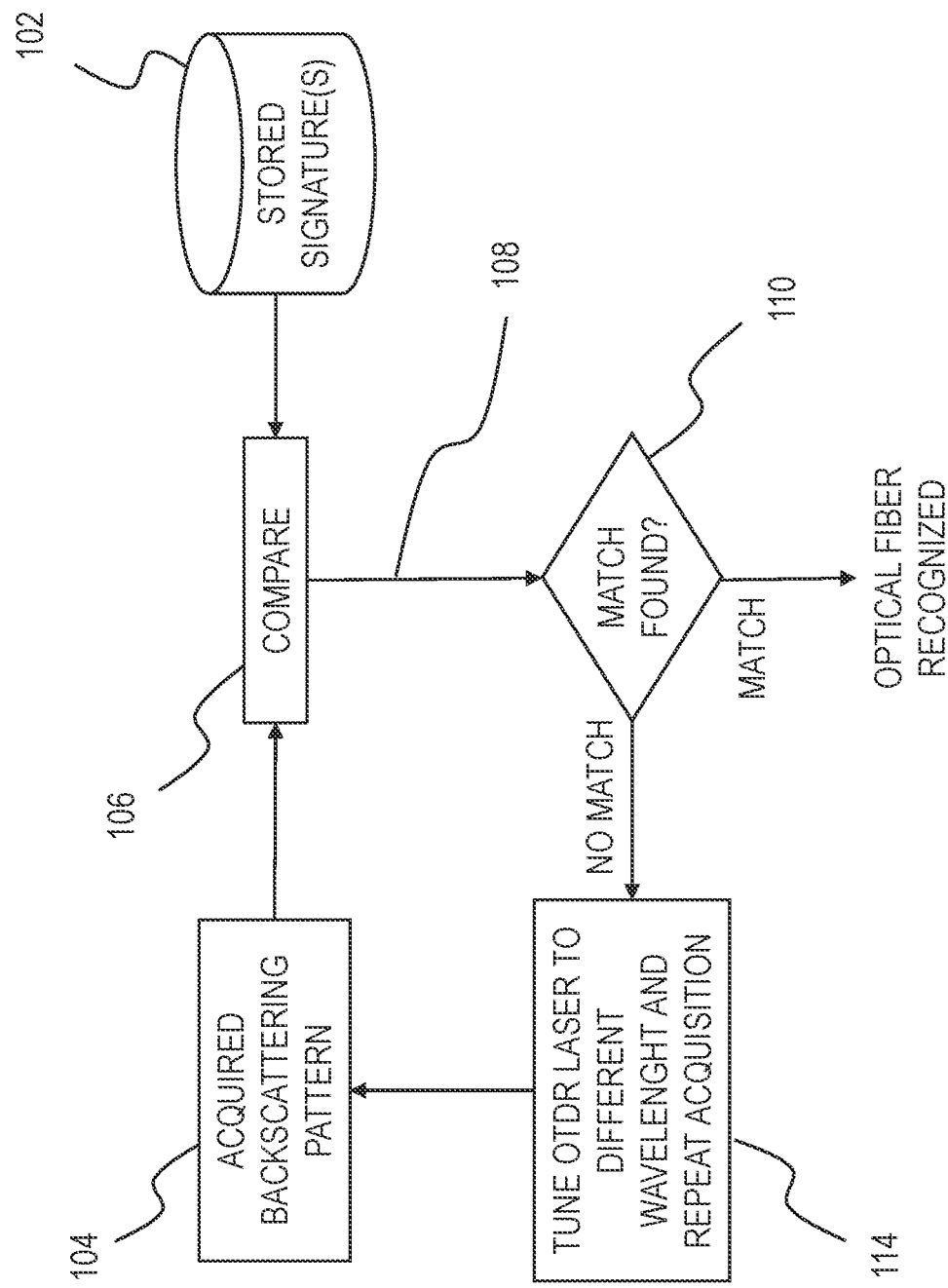
FIG. 14B is flowchart illustrating methods and systems for comparing OTDR signatures to recognize an optical fiber, in accordance with another embodiment wherein OTDR acquisitions are repeated with slightly drifted center wavelengths until the receive fiber is recognized.

Signature Matching Process:

FIGS. 14A and 14B illustrate methods and systems for comparing OTDR signatures to recognize an optical fiber. The methods of FIGS. 14A and 14B may be embodied, e.g., in a signature recognition module, which may be implemented, e.g., in a server-based application or in a processing unit integrated in an OTDR device (as described hereinbelow).

FIG. 14A illustrates the method and system in accordance with the first strategy described hereinabove, whereas FIG. 14B illustrates the method and system in accordance with the second strategy described hereinabove.

Referring to FIG. 14A, the method and system involve a data store 102 where at least a first set of prerecorded backscattering patterns corresponding to an optical fiber signature is stored. A set of backscattering patterns should therefore be built prior to the operation of the matching process. Each signature is obtained from prior OTDR acquisitions over an optical fiber link comprising a given optical fiber span to be later used to recognize an optical fiber. Each signature may comprise backscattering patterns measured over a sub-portion of optical fiber link over which an OTDR trace was acquired, and which corresponds to the given optical fiber span. In other cases, the backscattering patterns may cover the whole optical fiber link. As explained herein, for example, each signature may characterize a corresponding receive fiber among multiple receive fibers of a multi-fiber receive cable. Each signature may further comprise a plurality of backscattering patterns measured for different values of optical fiber temperatures or different values of OTDR laser center wavelengths. Of course, each signature may be associated to a unique identification number used to identify its corresponding optical fiber link or optical fiber span.

The signature recognition module receives, as an input, a backscattering pattern 104 acquired over at least one span of an optical fiber to be recognized. The backscattering pattern 104 typically corresponds to at least a portion of an OTDR trace acquired over an optical fiber link. In typical applications, the optical fiber link may comprise, e.g., a launch fiber, an optical fiber under test and a receive fiber. Therefore, in some embodiments, the relevant optical fiber span to be recognize may correspond, e.g., to the launch fiber or a portion thereof, to the receive fiber or a portion thereof or to the optical fiber under test or a portion thereof.

A comparison engine 106 compares the signature 104 to be recognized to the signatures stored in data store 102, in order to find a match. For example, the backscattering pattern 104 to be recognized is first compared to one of the stored backscattering patterns and outputs a comparison value 108.

For example, one backscattering pattern among the set of signatures may be recognized by calculating a cross-correlation between at least a portion of the OTDR trace and the one backscattering pattern among said set and calculating a correlation coefficient 108. The comparison may further involve searching along the acquired OTDR trace for a fiber span that matches the one of the stored backscattering patterns.

In some embodiments, the set of signatures 102 corresponds to pre-characterized receive fibers. In such case, the comparison engine 106 may search for the backscattering pattern along an end portion only of the OTDR trace, where the receive fiber is expected to be found. For example, a cross-correlation may be calculated between one backscattering pattern of the set of signatures 102 and an end portion of the OTDR trace. A link continuity of the optical fiber link under test is found when a match is found.

In step 110, the correlation coefficient 108 may be compared to a threshold in order to determine if the backscattering pattern 104 matches the one of the stored backscattering patterns. If a match is found, the fiber span over which the backscattering pattern 104 was acquired is found to be the same as that corresponding to the stored signature and the optical fiber is recognized. In step 112, if no match is found, the method moves a next one of the stored backscattering patterns and the backscattering pattern 104 to be recognized is compared to the next one of the stored backscattering patterns, until a match is found or all stored backscattering patterns are compared without a match. If no match is found, the fiber span over which the backscattering pattern 104 was acquired is found to not be the same as that corresponding to the stored signature and the optical fiber is not recognized.

Referring to FIG. 14B, the method and system involve a data store 102 where at least one prerecorded backscattering pattern corresponding to an optical fiber signature is stored. The backscattering pattern should therefore be acquired prior to the operation of the matching process. The signature is obtained from prior OTDR acquisition over an optical fiber link comprising a given optical fiber span to be later used to recognize an optical fiber. It may comprise the backscattering pattern measured over a sub-portion of optical fiber link which corresponds to the given optical fiber span. In this case, a single backscattering pattern may be recorded for a given signature. Of course, the data store 102 may comprise multiple signatures (e.g., corresponding to different receive fibers) which may each be associated to a unique identification number used to identify its corresponding optical fiber link or optical fiber span.

The signature recognition module receives, as an input, a backscattering pattern 104 acquired over at least one span of an optical fiber to be recognized. The backscattering pattern 104 typically corresponds to at least a portion of an OTDR trace acquired over an optical fiber link. In typical applications, the optical fiber link may comprise, e.g., a launch fiber, an optical fiber under test and a receive fiber. Therefore, in some embodiments, the relevant optical fiber span to be recognize may correspond, e.g., to the launch fiber or a portion thereof, to the receive fiber or a portion thereof or to the optical fiber under test or a portion thereof.

A comparison engine 106 compares the signature 104 to be recognized to a signature stored in data store 102, in order to find a match. For example, the backscattering pattern 104 to be recognized is compared to a stored backscattering pattern and outputs a comparison value 108.

For example, optical fiber signatures may be recognized by calculating a cross-correlation between at least a portion of the acquired OTDR trace 104 and the pre-recorded backscattering pattern 102 and calculating a correlation coefficient 108. The comparison may further involve searching along the acquired OTDR trace for a fiber span that matches the stored backscattering pattern.

In step 110, the correlation coefficient 108 may be compared to a threshold in order to determine if the backscattering pattern 104 matches the stored backscattering pattern. If a match is found, the fiber span over which the backscattering pattern 104 was acquired is found to be the same as that corresponding to the stored signature and the optical fiber is recognized. In step 114, if no match is found, the method tunes the OTDR laser source of the OTDR acquisition device used to acquire the backscattering pattern 104 to a different value of laser center wavelength to perform another OTDR acquisition and the next acquired backscattering pattern 104 is compared to the stored backscattering pattern 102, until a match is found or until the tuning range of the OTDR laser source is reached without a match. If no match is found, the fiber span over which the backscattering pattern 104 was acquired is found to not be the same as that corresponding to the stored signature and the optical fiber is not recognized.

Now referring to the methods and systems of both FIGS. 14A and 14B, in some embodiments, the set of signatures 102 may correspond to pre-characterized receive fibers. In such case, the comparison engine 106 may search for the backscattering pattern along an end portion only of the OTDR trace, where the receive fiber is expected to be found. For example, a cross-correlation may be calculated between one backscattering pattern of the set of signatures 102 and an end portion of the OTDR trace.

It is noted that some processing may be performed to extract a backscattering pattern from an acquired OTDR trace. For example, the backscattering pattern may be obtained by subtracting the backscattering slope and/or the offset from the OTDR trace over the relevant fiber span to be recognized, or applying some other filtering to remove low frequency content. However, in other embodiments, it may be possible to directly use the OTDR trace over the relevant fiber span as the backscattering pattern (including the backscattering slope and offset), depending on the specific calculation being implemented for the backscattering pattern comparison.

In one embodiment, the backscattering patterns are obtained directly from the OTDR trace along the fiber span and are normalized in terms of offset (e.g. the offset is subtracted on both traces). The RMS value of the difference between the backscattering pattern functions is then calculated and output as the comparison value 108, whereby lower RMS values indicate a higher degree of similarity and vice versa.

In another embodiment, the backscattering patterns are obtained by removing the backscattering slope and offset from the respective OTDR traces over the fiber span. The backscattering patterns are then compared by calculating the comparison value 108 as the correlation coefficient of the backscattering patterns of the first and the second backscattering patterns. A value of the correlation coefficient is thereby indicative of a likelihood of the first and the second backscattering patterns being acquired over the same optical fiber span.

A correlation coefficient between two functions may be calculated as the mean of the vector products divided by a normalization factor:

$$\rho_{X,Y} = \text{corr}(X, Y) = \frac{\text{cov}(X, Y)}{\sigma_X \sigma_Y} = \frac{E[(X - \mu_X)(X - \mu_Y)]}{\sigma_X \sigma_Y}$$

where X and Y are vectors contain the backscattering patterns to be compared (backscattering slope removed).

The absolute value of the resulting correlation coefficient lies between 0 and 1. The closer to 1 is the correlation coefficient, the more similar are the backscattering patterns (a correlation coefficient of −1 would indicate an inverse copy, which is not plausible in this context).

The correlation coefficient is typically lower than 1 because the backscattering patterns fluctuates due to the presence of electronic noise and fluctuations in time of the characteristics of the OTDR test pulses (polarization state, wavelength and/or spectral shape). Despite these limitations, when the ratio of backscattering pattern amplitude to electronic noise is greater than a given threshold of about 10, it is found that a correlation factor greater than about 0.7 indicates that the backscattering patterns match.

In yet another embodiment, any potential position offset between two backscattering patterns to be compared may be accounted for by calculating a cross-correlation instead of a correlation. The cross correlation will identify the best alignment to reach the greatest correlation coefficient.

A decision logic 110 determines whether the backscattering patterns compared by the comparison engine 106 match or not, from a comparison value 108. In one embodiment, the correlation coefficient is compared to a correlation threshold such that backscattering patterns are determined to match if a correlation coefficient is greater than or equal to the correlation threshold such as, e.g., 0.5 or 0.7.

Figure 15:
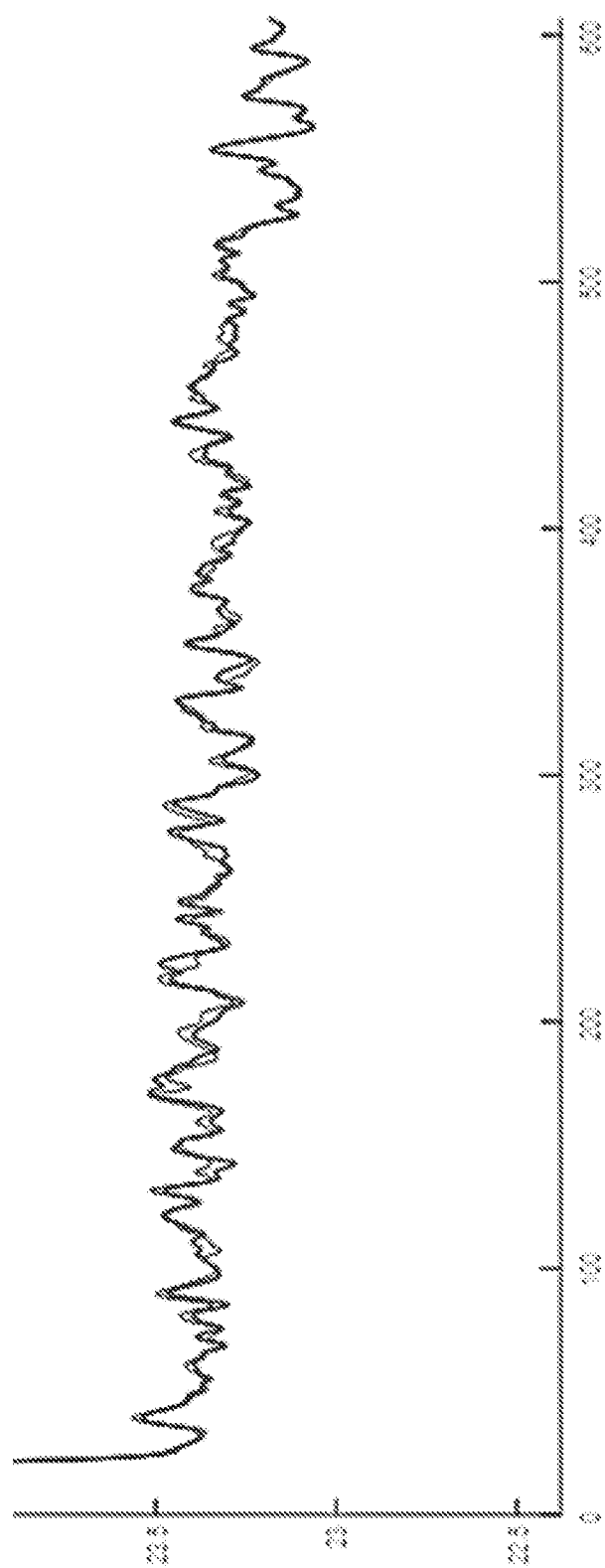
FIG. 15 is a graph showing an example of two backscattering patterns acquired over the same optical fiber and for which the calculated correlation coefficient is 85%.

For instance, FIG. 15 shows an example of two backscattering patterns acquired over the same optical fiber (corresponding respectively to a pre-recorded signature 102 and an acquired backscattering pattern 104) and for which the calculated correlation coefficient is 85%.

In one embodiment, when the comparison value 108 meets the correlation threshold, the signature recognition module outputs the identification number corresponding to the backscattering pattern that is found to match, among those stored in data store 102.

If the comparison value 108 does not meet the correlation threshold, the process may be repeated with another backscattering pattern or another signature from the database until a match is found.

Bidirectional Test—Reverse Pattern

Referring to equations (2) and (3), convolution is not a symmetric operator. This implies that the backscattering pattern measured from one end of an optical fiber is different from that measured from the other end. Therefore, in some applications where the backscattering patterns 102 and 104 are not acquired from the same end of the optical fiber to be recognized, some processing may be needed to reverse one backscattering pattern before comparison.

Referring to FIG. 12, in the configurations of FIGS. 10 and 11, the backscattering patterns acquired in step 1206 over the receive fiber (far end span of the link) need to be reversed in step 1212 before being matched in step 1214 to backscattering patterns acquired over the launch fiber (near end span of the link).

Reversed backscattering patterns are also used for testing duplex links as shown in FIGS. 13A, 13B and 13C.

In one embodiment, the reversed backscattering pattern may simply be obtained by applying a mirror function (f'(x)=f(L−x)) to the acquired backscattering pattern.

However, a backward backscattering pattern, i.e., as would be measured in the backward direction, mirrors the forward backscattering pattern, with the exception that the samples are filtered with an anti-causal filter as a result of the OTDR transfer function. But because convolution is a linear operator, it is possible to retrieve the same pattern from OTDR acquisitions performed from both sides of an optical fiber, by processing the OTDR traces.

Therefore, in another embodiment, the correlation between the patterns may be improved by compensating the changes in transfer functions. This can be done by performing a convolution on both patterns with the reversed OTDR transfer function. Therefore, the backwardly-measured backscattering pattern is reversed by 1) convoluting the backscattering pattern with the reversed OTDR transfer function and 2) applying a mirror function (f'(x)=f(L−x)). The reversed backscattering pattern can then be compared with the forwardly measured backscattering pattern as convoluted with the reversed OTDR transfer function.

Comparing OTDR Traces Acquired with Different Pulsewidths or Sampling:

Comparing backscattering patterns is simpler to apply when the two OTDR traces to compare are acquired with the same OTDR conditions, including the same pulse width and the same sampling resolution. However, in practical cases, all OTDR traces may not always be acquired with the same conditions, e.g., if the OTDR device has an automatic OTDR condition selection mode in single pulse width and multi-pulsewidth acquisitions. In this case, a preliminary data preparation step may be needed. Using known signal processing techniques, the OTDR trace acquired with the greatest sampling resolution may be resampled to match the sampling resolution of the other. Furthermore, because longer pulses have a smoothing effect on the backscattering pattern, the correlation process may further be improved by filtering the OTDR trace acquired with the smallest pulses to match the response of the larger pulses. One method to compensate for the pulse length difference is by performing a convolution of the OTDR trace acquired with the shortest pulse with a filter that is equivalent to the pulse length of the longest pulse. After this preprocessing, the two OTDR traces have the same equivalent resolution and can be better compared. In this case, the correlation threshold may optionally be adjusted to account for a correlation penalty induced by different acquisition conditions.

Polarization Noise:

A Polarization noise can affect the backscattering pattern. The backscattering pattern tends to vary with the polarization states of light propagating in the optical fiber when the optical system or the optical fiber under test exhibits high polarization dispersion properties, thereby introducing a polarization noise. Accordingly, in some embodiments, the OTDR acquisition device used for the signature recognition may comprise a polarization scrambler (see 1080 in FIG. 10) to scramble the polarization state of the OTDR laser source. The use of a polarization scrambler reduces the variability of the backscattering pattern that is due to varying polarization states of light propagating in the optical fiber. Polarization scrambling is optional because, in some cases, the polarization noise can be neglected, e.g., if the DUT does not exhibit excessive polarization mode dispersion.

Example of OTDR Device Architecture

Figure 16:
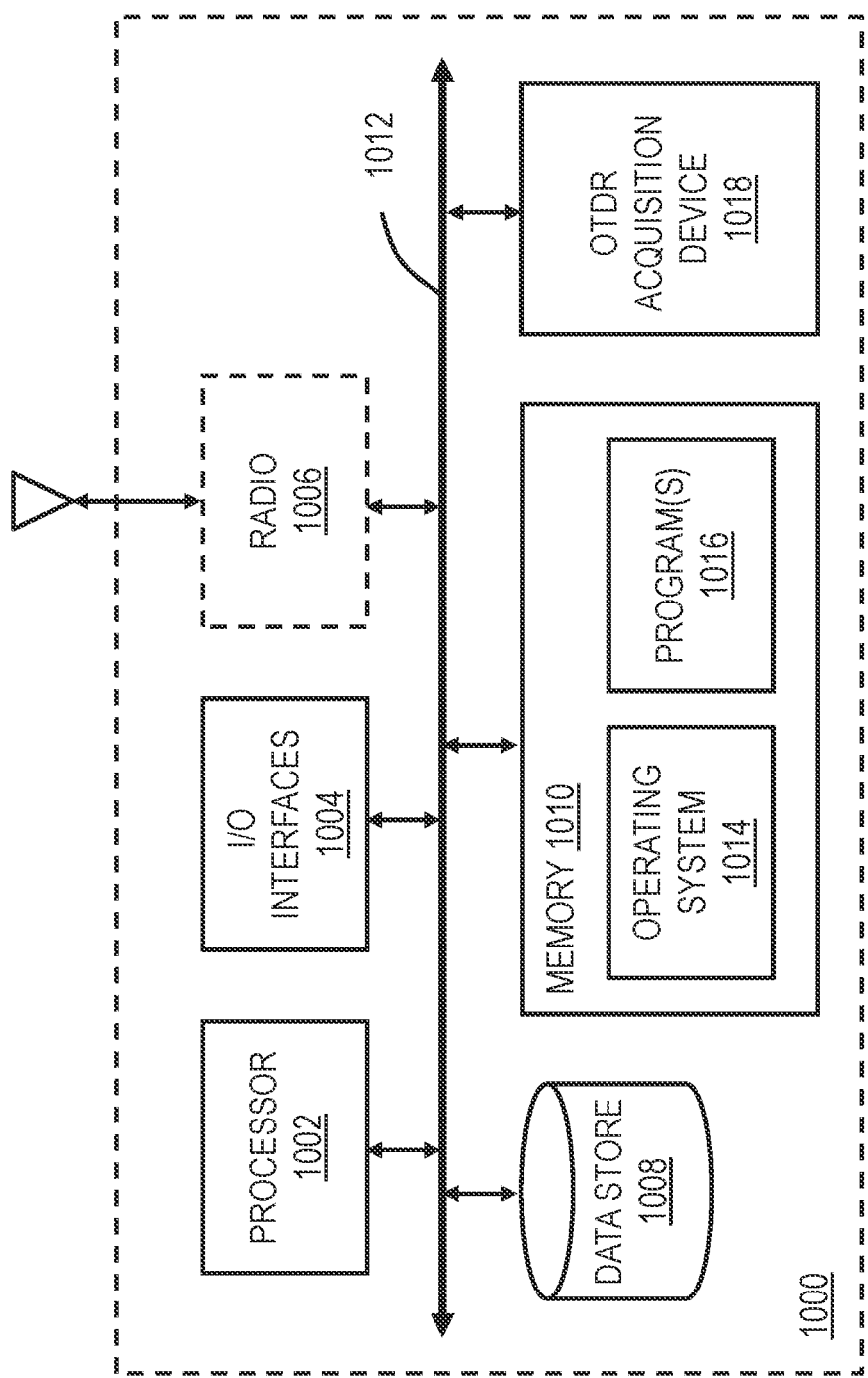
FIG. 16 is a block diagram illustrating an example architecture of an OTDR device of the system of FIG. 1.

FIG. 16 is a block diagram of an OTDR device 1000 which may embody anyone of the methods described herein. The OTDR device 1000 may comprise a digital device that, in terms of hardware architecture, generally includes a processor 1002, input/output (I/O) interfaces 1004, an optional radio 1006, a data store 1008, a memory 1010, as well as an optical test device including an OTDR acquisition device 1018. It should be appreciated by those of ordinary skill in the art that FIG. 16 depicts the OTDR device 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the OTDR device 1000 is in operation, the processor 1002 is configured to execute software stored within the memory 1010, to communicate data to and from the memory 1010, and to generally control operations of the OTDR device 1000 pursuant to the software instructions. In an embodiment, the processor 1002 may include an optimized mobile processor such as optimized for power consumption and mobile applications. The 1/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The 1/O interfaces 1004 can be used to display a graphical user interface (GUI) that enables a user to interact with the OTDR device 1000 and/or output at least one of the values derived by the OTDR analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 16, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the OTDR device 1000. For example, example programs 1016 may include a web browser to connect with a server for transferring OTDR measurement data files, a dedicated OTDR application configured to control OTDR acquisitions by the OTDR acquisition device 1018, set OTDR acquisition parameters, analyze OTDR traces obtained by the OTDR acquisition device 1018 and display a GUI related to the OTDR device 1000. For example, the dedicated OTDR application may embody an OTDR analysis module configured to analyze acquired OTDR traces in order to characterize the optical fiber link under test, and produce OTDR measurement data files. It may further embody a signature recognition module as described herein.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the OTDR device 1000 via the radio 106. In such cases, at least some of the programs 1016 may be located in a memory of such a mobile device, for execution by a processor of the physically distinct device. The mobile may then also include a radio and be used to transfer OTDR measurement data files toward a remote test application residing, e.g., on a server.

It should be noted that the OTDR device shown in FIG. 16 is meant as an illustrative example only. Numerous types of computer systems are available and can be used to implement the OTDR device.

Example of OTDR Acquisition Device Architecture

Figure 17:
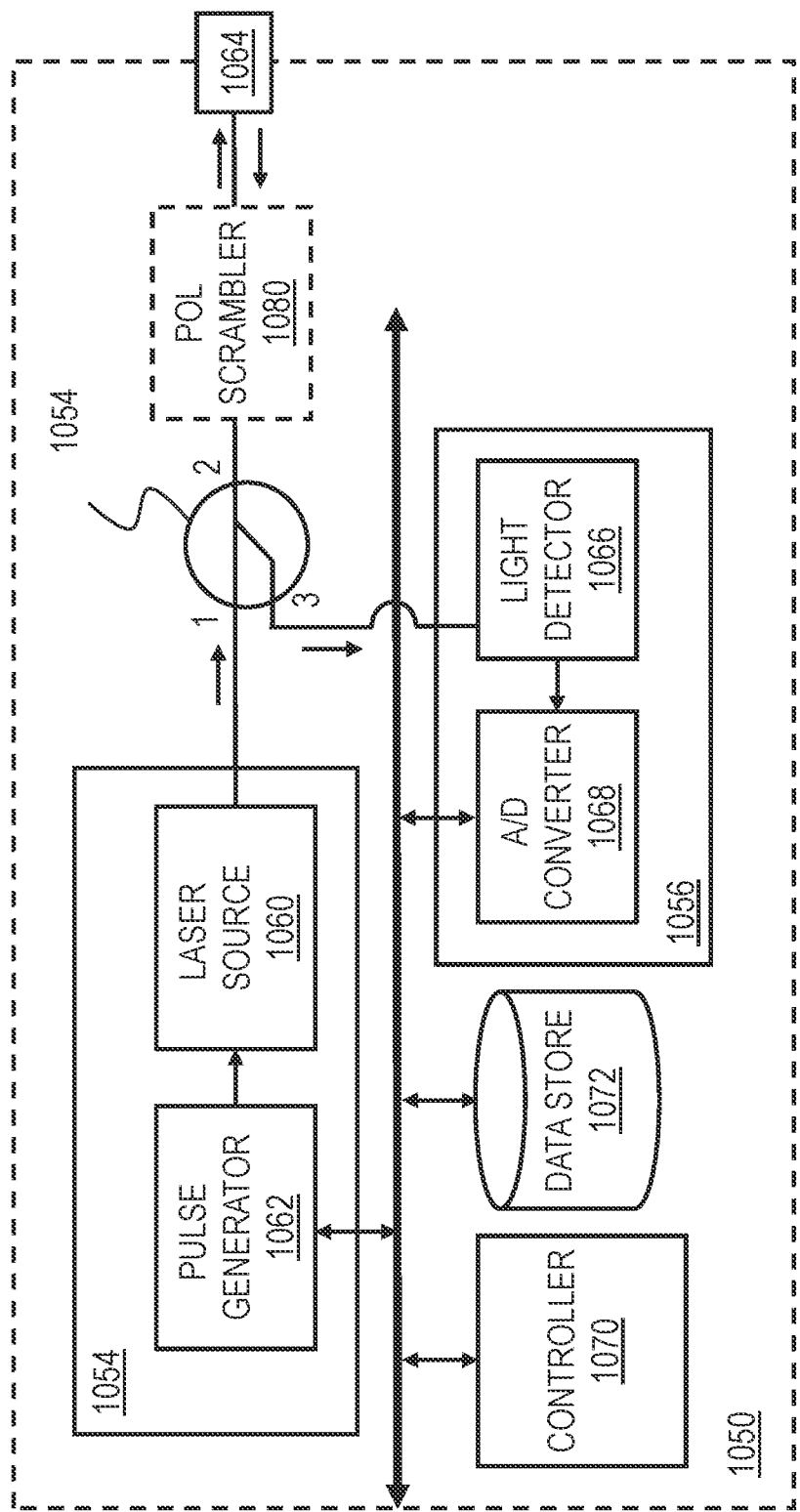
FIG. 17 is a block diagram illustrating an example architecture of an OTDR acquisition device of the OTDR device of FIG. 16.

FIG. 17 is a block diagram an embodiment of an OTDR acquisition device 1050 which may embody the OTDR acquisition device 1018 of the OTDR device 1000 of FIG. 16.

The OTDR acquisition device 1050 is connectable toward the tested optical fiber link via an output interface 1064, for performing OTDR acquisitions toward the optical fiber link. The OTDR acquisition device 1050 comprises conventional optical hardware and electronics as known in the art for performing OTDR acquisitions over an optical fiber link.

The OTDR acquisition device 1050 comprises a light generating assembly 1054, a detection assembly 1056, a directional coupler 1058, as well as a controller 1070 and a data store 1072.

The light generating assembly 1054 is embodied by a laser source 1060 driven by a pulse generator 1062 to generate the OTDR test signal comprising test light pulses having desired characteristics. As known in the art, the light generating assembly 1054 is adapted to generate test light pulses of varied pulse widths, repetition periods and optical power through a proper control of the pattern produced by the pulse generator 1062. One skilled in the art will understand that it may be beneficial or required by the application to perform OTDR measurements at various different wavelengths. For this purpose, in some embodiments, the light generating assembly 1054 is adapted to generate test light pulses having varied wavelengths by employing a laser source 1060 that is tunable for example. In other embodiments, the light generating assembly 1054 is adapted to generate test light pulses having varied wavelengths by employing multiple laser sources 1060 having different center wavelengths, the output of which being combined toward the output port, using an optical coupler.

It will be understood that the light generating assembly 1054 may combine both pulse width and wavelength control capabilities. Of course, different and/or additional components may be provided in the light generating assembly, such as modulators, lenses, mirrors, optical filters, wavelength selectors and the like.

The light generating assembly 1054 is coupled to the output interface 1064 of the OTDR acquisition device 1050 through a directional coupler 1058, such as a circulator, having three or more ports. The first port is connected to the light generating assembly 1054 to receive the test light pulses therefrom. The second port is connected toward the output interface 1064. The third port is connected to the detection assembly 1056. The connections are such that test light pulses generated by the light generating assembly 1054 are coupled to the output interface 1064 and that the return light signal arising from backscattering and reflections along the optical fiber link 110 is coupled to the detection assembly 1056.

The detection assembly 1056 comprises a light detector 1066, such as a photodiode, an avalanche photodiode or any other suitable photodetector, which detects the return light signal corresponding to each test light pulse, and an analog to digital converter 1068 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

Of course, the OTDR acquisition device 1050 may also be used to perform multiple acquisitions with varied pulse widths to obtain a multi-pulsewidth OTDR measurement.

The OTDR acquisition device 1050, and more specifically the light generating assembly 1054 is controlled by the controller 1070. The controller 1070 is a hardware logic device. It may comprise one or more Field Programmable Gate Array (FPGA); one or more Application Specific Integrated Circuits (ASICs) or one or more processors, configured with a logic state machine or stored program instructions. When the OTDR acquisition device 1050 is in operation, the controller 1070 is configured to control the OTDR measurement process. The controller 1070 controls parameters of the light generating assembly 1054 according to OTDR acquisition parameters that are either provided by the operator of the OTDR software or otherwise determined by program(s) 1016.

The data store 1072 may be used to cumulate raw data received from the detection assembly 1056, as well as intermediary averaged results and resulting OTDR traces. The data store 1008 may include any of volatile memory elements (e.g., random access memory (RAM, such as DRAM, SRAM, SDRAM, and the like)) or the like and it may be embedded with the controller 1070 or distinct.

The OTDR traces acquired by the OTDR acquisition device 1050 may be received and analyzed by one or more of the computer programs 1016 and/or stored in data store 1008 for further processing.

It should be noted that the architecture of the OTDR acquisition device 1050 as shown in FIG. 17 is meant as an illustrative example only. Numerous types of optical and electronic components are available and can be used to implement the OTDR acquisition device.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The embodiments described above are intended to be exemplary only. The scope of the invention is therefore intended to be limited solely by the appended claims.

The invention claimed is:

1. An OTDR method for testing a fiber link continuity of an optical fiber link connected at its remote end to a receive fiber, the method comprising:
  receiving a backscattering pattern obtained from a pre-characterization of the receive fiber, said backscattering pattern being caused by fluctuations at least partly inherent from an optical fiber structure of said receive fiber and defines a signature of the receive fiber;
  performing an OTDR acquisition toward the optical fiber link, wherein said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test; and
  searching in said OTDR trace for said backscattering pattern to determine if said OTDR trace comprises said backscattering pattern, wherein said signature is used to recognize said receive fiber in said OTDR trace;
  wherein a link continuity is determined when said backscattering pattern is found in said OTDR trace.

2. An OTDR method for testing fiber link continuity in a multi-fiber device comprising a plurality of optical fiber links, according to a fiber arrangement, the method comprising:
  receiving a set of backscattering patterns obtained from a pre-characterization of a corresponding set of receive fibers, said backscattering patterns being caused by fluctuations at least partly inherent from an optical fiber structure of said receive fibers and define signatures of the receive fibers;
  performing an OTDR acquisition toward at least one of said optical fiber links, said one of said optical fiber links being connected at its remote end to a first receive fiber and wherein said OTDR acquisition is performed by propagating a test signal in the optical fiber link under test and detecting corresponding return light signal from the optical fiber link so as to obtain an OTDR trace representing backscattered and reflected light as a function of distance in the optical fiber link under test; and
  in said OTDR trace, searching for one backscattering pattern among said set of backscattering patterns, corresponding to one receive fiber, to determine if said first receive fiber matches said one receive fiber, wherein said backscattering patterns are used as signatures to recognize said one receive fiber in said OTDR trace;
  wherein a link continuity of said one of said optical fiber links is determined when a match is found.

3. The OTDR method as claimed in claim 2, wherein a fiber arrangement of said one of said optical fiber links within said multi-fiber device is determined at least from said match.

4. The OTDR method as claimed in claim 2, wherein the step of searching comprises: calculating a correlation coefficient between at least a first portion of said OTDR trace and said one backscattering pattern among said set; and comparing the correlation coefficient to a threshold to determine if said first receive fiber matches said one receive fiber.

5. The OTDR method as claimed in claim 2, wherein the received set of backscattering patterns is recorded from prior reference OTDR acquisitions conducted toward respective receive fibers to characterize the signature of each receive fiber of said set of receive fibers.

6. The OTDR method as claimed in claim 2, wherein said backscattering patterns are acquired while the test signal is being polarization scrambled.

7. The OTDR method as claimed in claim 2, wherein said set of backscattering patterns comprises a plurality of backscattering patterns for each receive fiber of said set of receive fibers, obtained for different values of optical fiber temperatures or different values of OTDR laser center wavelengths.

8. The OTDR method as claimed in claim 2, further comprising repeating said performing an OTDR acquisition toward said one of said optical fiber links for a plurality of OTDR laser center wavelengths.

9. The OTDR method as claimed in claim 2,
  wherein each one of said plurality of optical fiber links is connected in loop between a first launch/receive fiber connected at its first end and a second launch/receive fiber connected at its second end;
  wherein the step of performing an OTDR acquisition comprises performing a first OTDR acquisition from said first end of said one of said optical fiber links so as to obtain a first OTDR trace;
  wherein said set of backscattering patterns comprises said one backscattering pattern that is extracted from a second OTDR trace acquired from said second end of said one of said optical fiber links and corresponds to at least a portion of said second launch/receive fiber; and
  wherein the step of searching comprises searching in said first OTDR trace, for said one backscattering pattern, to determine if said first OTDR trace matches said second OTDR trace;
  wherein a link continuity between said first end and said second end is determined when a match is found.

10. The OTDR method as claimed in claim 9,
  wherein said one backscattering pattern is obtained by reversing a portion of said second OTDR trace corresponding to at least a portion of said second launch/receive fiber; and
  wherein the step of searching comprises: calculating a correlation coefficient between at least a first portion of said OTDR trace and said one backscattering pattern; and comparing the correlation coefficient to a threshold to determine if said first OTDR trace and said second OTDR trace were acquired over a same optical fiber link.

11. The OTDR method as claimed in claim 10, wherein the step of searching comprises convoluting said at least a first portion of said OTDR trace and said one backscattering pattern with a reversed OTDR transfer function before calculating said correlation coefficient.

12. The OTDR method as claimed in claim 11, wherein a fiber arrangement of said one of said optical fiber links within said multi-fiber device is determined from said match.

13. An OTDR system for testing fiber link continuity in a multi-fiber device comprising a plurality of optical fiber links, according to a fiber arrangement, the OTDR system comprising:
- a data store storing a set of backscattering patterns acquired over a corresponding set of receive fibers, said backscattering patterns caused by fluctuations at least partly inherent from an optical fiber structure of said receive fibers;
- an OTDR acquisition device connectable toward an end of an optical fiber link under test for performing one or more OTDR acquisitions toward the optical fiber link under test, wherein each OTDR acquisition is performed by propagating a test signal in the optical fiber link under test and detecting corresponding return light from the optical fiber link under test so as to obtain an OTDR trace representing backscattered and reflected light as a function of distance in the optical fiber link under test;
- a processing unit configured for:
  - receiving an OTDR trace acquired toward at least one of said optical fiber links of said multi-fiber device, said one of said optical fiber links being connected at its remote end to a first receive fiber; and
  - searching in said OTDR trace for one backscattering pattern among said set, corresponding to one receive fiber, to determine if said first receive fiber matches said one receive fiber, wherein said backscattering patterns are used as signatures to recognize said one receive fiber in said OTDR trace;
- wherein a link continuity of said one of said optical fiber links is determined when a match is found.

14. An OTDR method for testing fiber link continuity in a multi-port device comprising at least one optical fiber link connected in loop between two ports of said multi-port device, according to a fiber arrangement, the method comprising:
- performing OTDR acquisitions toward corresponding ports of said multi-port device to obtain a corresponding set of OTDR traces, wherein each OTDR acquisition is performed by propagating a test signal in the optical fiber link under test and detecting corresponding return light signal from the optical fiber link so as to obtain an OTDR trace representing backscattered and reflected light as a function of distance in the optical fiber link under test and wherein said corresponding ports comprise said two ports connected to said at least one optical fiber link;
- extracting from at least one OTDR trace among said set, a first backscattering pattern corresponding to at least a portion of said one OTDR trace acquired over a first fiber span, wherein said one OTDR trace is acquired toward one port of a first optical fiber link;
- searching for said first backscattering pattern in at least another OTDR trace of said set, wherein said another OTDR trace is found to match said one OTDR trace when the first backscattering pattern is found, the matching OTDR traces then being determined to be acquired toward opposite ports of said first optical fiber link;
- wherein a link continuity of said first optical fiber link is determined when a match is found.

15. The OTDR method as claimed in claim 14, wherein a fiber arrangement of said one of optical fiber links within said multi-port device is determined from said match.

16. The OTDR method as claimed in claim 14, wherein a launch/receive fiber is connected to each port of said multi-port device and wherein said first backscattering pattern is extracted to correspond to at least a portion of one launch/receive fiber connected to said one port or the opposite port.

17. The OTDR method as claimed in claim 16,
- wherein said first backscattering pattern is obtained by reversing a portion of said one OTDR trace corresponding to at least a portion of one launch/receive fiber connected to said one port or said other port; and
- wherein the step of searching comprises: calculating correlation coefficient between at least a portion of another OTDR trace and said first backscattering pattern; and comparing the correlation coefficient to a threshold to determine if said one OTDR trace and said another OTDR trace were acquired over a same optical fiber link.

18. The OTDR method as claimed in claim 17, wherein the step of searching comprises convoluting said at least a portion of said one OTDR trace and said portion of another OTDR trace with a reversed OTDR transfer function before calculating said correlation coefficient.

* * * * *